(12) United States Patent
Holmberg et al.

(10) Patent No.: US 9,939,600 B2
(45) Date of Patent: *Apr. 10, 2018

(54) OPTICAL FIBER DISCONNECT/RECONNECT APPARATUS

(71) Applicant: CommScope Technologies LLC, Hickory, NC (US)

(72) Inventors: Matthew Holmberg, Le Center, MN (US); James J. Solheid, Lakeville, MN (US)

(73) Assignee: CommScope Technologies LLC, Hickory, NC (US)

( * ) Notice: Subject to any disclaimer, the term of this patent is extended or adjusted under 35 U.S.C. 154(b) by 224 days.

This patent is subject to a terminal disclaimer.

(21) Appl. No.: 14/846,320

(22) Filed: Sep. 4, 2015

(65) Prior Publication Data

US 2016/0116698 A1 Apr. 28, 2016

Related U.S. Application Data

(63) Continuation of application No. 13/873,709, filed on Apr. 30, 2013, now Pat. No. 9,126,802.
(Continued)

(51) Int. Cl.
*H02G 11/02* (2006.01)
*G02B 6/44* (2006.01)
(Continued)

(52) U.S. Cl.
CPC .......... *G02B 6/4457* (2013.01); *B65H 75/28* (2013.01); *B65H 75/38* (2013.01);
(Continued)

(58) Field of Classification Search
CPC .......... H02G 11/00; H02G 11/02; H02G 15/00
See application file for complete search history.

(56) References Cited

U.S. PATENT DOCUMENTS

| 342,354 A | 5/1886 | Harper |
|---|---|---|
| 415,423 A | 11/1889 | Smith |

(Continued)

FOREIGN PATENT DOCUMENTS

| DE | 1253985 | 11/1967 |
|---|---|---|
| EP | 0 292 460 A2 | 11/1988 |

(Continued)

OTHER PUBLICATIONS

Catalogue-Fastening Solutions—RICHCO—(Version JPG)—p. 227, 3 pages. (Date Unknown).
(Continued)

*Primary Examiner* — Robert J McCarry, Jr.
(74) *Attorney, Agent, or Firm* — Merchant & Gould P.C.

(57) ABSTRACT

A payout spool for a cable includes a base, a spool, and a disconnect/reconnect device. The cable extends between a first and a second end. The payout spool pays out the cable when the first end of the cable is pulled away from the payout spool. The base includes a terminal for transmitting and/or receiving a signal to and/or from the cable. The spool is rotatably mounted to the base about an axis. The spool is adapted to unwrap the cable about a wrapping area of the spool when the spool is rotated about the axis. The disconnect/reconnect device may be adapted to disconnect the second end of the cable from the terminal when the payout spool pays out the cable and reconnect the same when the payout spool is not paying out the cable.

19 Claims, 26 Drawing Sheets

Related U.S. Application Data

(60) Provisional application No. 61/640,435, filed on Apr. 30, 2012.

(51) Int. Cl.
*B65H 75/38* (2006.01)
*B65H 75/44* (2006.01)
*B65H 75/28* (2006.01)
*G02B 6/38* (2006.01)

(52) U.S. Cl.
CPC ....... *B65H 75/4449* (2013.01); *G02B 6/3825* (2013.01); *G02B 6/3897* (2013.01); *H02G 11/02* (2013.01); *B65H 2701/32* (2013.01); *B65H 2701/34* (2013.01)

(56) References Cited

U.S. PATENT DOCUMENTS

| | | |
|---|---|---|
| 1,137,133 A | 4/1915 | Hamelback |
| 1,276,825 A | 8/1918 | Swope |
| 1,588,577 A | 6/1926 | Heiner |
| 1,592,030 A | 7/1926 | Langsner |
| 1,858,371 A | 5/1932 | Lutz |
| 2,206,352 A | 7/1940 | Hellmann |
| 2,260,109 A | 10/1941 | Amdal |
| 2,440,974 A | 5/1948 | Resch |
| 2,605,060 A | 7/1952 | Bell |
| 2,752,106 A | 6/1956 | Thompson |
| 2,776,093 A | 1/1957 | Cox et al. |
| 2,874,918 A | 2/1959 | Steiber |
| 2,905,409 A | 9/1959 | Sheldon |
| 2,941,746 A | 6/1960 | Hunt |
| 3,015,384 A | 1/1962 | Kellogg |
| 3,120,355 A | 2/1964 | Bowman |
| 3,160,360 A | 12/1964 | Spieldiener et al. |
| 3,208,121 A | 9/1965 | Price |
| 3,632,061 A | 1/1972 | Roseboom |
| 3,822,834 A | 7/1974 | Fjarlie |
| 3,831,879 A | 8/1974 | Miller et al. |
| 3,843,071 A | 10/1974 | Graham |
| 4,008,791 A | 2/1977 | Shafii-Kahany et al. |
| 4,055,314 A | 10/1977 | Kovaleski |
| 4,108,390 A | 8/1978 | Hayes |
| 4,111,380 A | 9/1978 | Heuckroth |
| 4,174,816 A | 11/1979 | Olson |
| 4,186,897 A | 2/1980 | Brown |
| 4,222,535 A | 9/1980 | Hosbein |
| 4,273,392 A | 6/1981 | Stinson |
| 4,282,954 A | 8/1981 | Hill |
| 4,301,611 A | 11/1981 | Lapinski |
| 4,436,224 A | 3/1984 | McInerny |
| 4,565,333 A | 1/1986 | Meneian |
| 4,664,260 A | 5/1987 | Stokes |
| 4,936,452 A | 6/1990 | Pauley |
| 4,978,191 A | 12/1990 | Hasegawa et al. |
| 5,022,600 A | 6/1991 | Blanc et al. |
| 5,058,259 A | 10/1991 | Araki et al. |
| 5,069,523 A | 12/1991 | Finzel et al. |
| 5,078,466 A | 1/1992 | MacCulloch |
| 5,098,028 A | 3/1992 | Ida et al. |
| 5,117,859 A | 6/1992 | Carlson |
| 5,165,543 A | 11/1992 | Heyda et al. |
| 5,265,822 A | 11/1993 | Shober, Jr. et al. |
| 5,268,986 A | 12/1993 | Kakii et al. |
| 5,277,314 A | 1/1994 | Cooper et al. |
| 5,294,068 A | 3/1994 | Baro et al. |
| 5,305,937 A | 4/1994 | Barnett |
| 5,332,171 A | 7/1994 | Steff |
| 5,335,874 A | 8/1994 | Shrum et al. |
| 5,367,827 A | 11/1994 | Tajima et al. |
| 5,388,781 A | 2/1995 | Sauber |
| 5,421,530 A | 6/1995 | Bertagna et al. |
| 5,450,509 A | 9/1995 | Davis |
| 5,481,607 A | 1/1996 | Hsiao |
| 5,494,446 A | 2/1996 | DeLucia et al. |
| 5,544,836 A | 8/1996 | Pera |
| 5,598,987 A | 2/1997 | Wachowicz |
| 5,607,316 A | 3/1997 | Ishikawa |
| 5,630,456 A | 5/1997 | Hugo et al. |
| 5,641,067 A | 6/1997 | Ellis |
| 5,669,571 A | 9/1997 | Graybill |
| 5,679,015 A | 10/1997 | Schauer |
| 5,689,605 A | 11/1997 | Cobb et al. |
| 5,758,834 A | 6/1998 | Dragoo et al. |
| 5,772,146 A | 6/1998 | Kawamoto et al. |
| 5,797,558 A | 8/1998 | Peterson et al. |
| 5,802,237 A | 9/1998 | Pulido |
| 5,857,285 A | 1/1999 | Little |
| 5,913,487 A | 6/1999 | Leatherman |
| 5,915,062 A | 6/1999 | Jackson et al. |
| 5,915,641 A | 6/1999 | Barberg |
| 5,921,497 A | 7/1999 | Utley, Jr. |
| D412,439 S | 8/1999 | Cormack |
| 5,993,229 A | 11/1999 | Tanaka et al. |
| 5,996,930 A | 12/1999 | Katayama et al. |
| 6,015,110 A | 1/2000 | Lai |
| 6,019,308 A | 2/2000 | Huang |
| D422,170 S | 4/2000 | Harris, Jr. |
| 6,077,108 A | 6/2000 | Lorscheider et al. |
| 6,215,938 B1 | 4/2001 | Reitmeier et al. |
| 6,220,413 B1 | 4/2001 | Walters et al. |
| 6,250,578 B1 | 6/2001 | Manda |
| 6,260,781 B1 | 7/2001 | Cooper |
| 6,305,958 B1 | 10/2001 | Maegawa et al. |
| 6,311,007 B1 | 10/2001 | Daoud |
| 6,325,665 B1 | 12/2001 | Chung |
| 6,328,243 B1 | 12/2001 | Yamamoto |
| 6,349,893 B1 | 2/2002 | Daoud |
| 6,361,237 B1 | 3/2002 | Salmela |
| 6,375,109 B1 | 4/2002 | Liao |
| 6,405,961 B1 | 6/2002 | Mastrangelo |
| 6,422,503 B1 | 7/2002 | Hoo Kong |
| 6,433,274 B1 | 8/2002 | Doss et al. |
| 6,434,313 B1 | 8/2002 | Clapp, Jr. et al. |
| 6,484,958 B1 | 11/2002 | Xue et al. |
| 6,501,898 B1 | 12/2002 | Engberg et al. |
| 6,522,826 B2 | 2/2003 | Gregory |
| 6,572,393 B2 | 6/2003 | Kawamura |
| RE38,211 E | 8/2003 | Peterson et al. |
| 6,612,515 B1 | 9/2003 | Tinucci et al. |
| 6,616,080 B1 | 9/2003 | Edwards et al. |
| 6,643,443 B2 | 11/2003 | Holman et al. |
| 6,643,444 B1 | 11/2003 | Putnam |
| 6,643,445 B2 | 11/2003 | Bumgarner et al. |
| 6,733,328 B2 | 5/2004 | Lin et al. |
| 6,744,954 B1 | 6/2004 | Tanaka et al. |
| 6,795,633 B2 | 9/2004 | Joseph, II |
| 6,819,848 B2 | 11/2004 | Takahashi |
| 6,856,748 B1 | 2/2005 | Elkins, II et al. |
| 6,871,812 B1 | 3/2005 | Chang |
| 6,915,058 B2 | 7/2005 | Pons |
| 6,997,410 B1 | 2/2006 | Huang |
| 7,017,846 B2 | 3/2006 | Tsoi et al. |
| 7,032,854 B2 | 4/2006 | Marsden |
| 7,036,761 B2 | 5/2006 | Washington et al. |
| 7,086,512 B2 | 8/2006 | Shack et al. |
| 7,104,491 B2 | 9/2006 | Vinding |
| 7,116,883 B2 | 10/2006 | Kline et al. |
| 7,120,349 B2 | 10/2006 | Elliott |
| 7,182,286 B2 | 2/2007 | Huang |
| 7,229,042 B2 | 6/2007 | Thebault et al. |
| D551,477 S | 9/2007 | Kikuchi |
| 7,266,283 B2 | 9/2007 | Kline et al. |
| 7,315,681 B2 | 1/2008 | Kewitsch |
| 7,357,666 B2 | 4/2008 | Wu |
| 7,369,739 B2 | 5/2008 | Kline et al. |
| 7,460,753 B2 | 12/2008 | Kewitsch |
| 7,497,351 B2 | 3/2009 | Amundson et al. |
| 7,548,679 B2 | 6/2009 | Hirano et al. |
| 7,599,598 B2 | 10/2009 | Gniadek et al. |
| 7,627,218 B2 | 12/2009 | Hurley |
| 7,665,901 B2 | 2/2010 | Kewitsch |
| 7,680,386 B2 | 3/2010 | Hurley |

(56) References Cited

U.S. PATENT DOCUMENTS

| | | | |
|---|---|---|---|
| 7,715,679 B2 | 5/2010 | Kowalczyk et al. | |
| 7,756,379 B2 | 7/2010 | Kowalczyk et al. | |
| 7,869,682 B2 | 1/2011 | Kowalczyk et al. | |
| 8,238,707 B2 | 8/2012 | Smrha et al. | |
| 8,474,742 B2 | 7/2013 | Smrha | |
| 8,720,810 B2 | 5/2014 | Whitaker | |
| 8,800,910 B2 | 8/2014 | Shepherd | |
| D501,722 S | 2/2015 | Zimmerman | |
| 9,126,802 B2* | 9/2015 | Holmberg | B65H 75/38 |
| 2002/0122643 A1 | 9/2002 | Bueschelberger et al. | |
| 2003/0059192 A1 | 3/2003 | Johnson | |
| 2003/0089818 A1 | 5/2003 | Reau et al. | |
| 2003/0095773 A1 | 5/2003 | Ichinari et al. | |
| 2004/0211851 A1 | 10/2004 | Barton et al. | |
| 2005/0167544 A1 | 8/2005 | Elliott et al. | |
| 2005/0247813 A1 | 11/2005 | Kovacevich et al. | |
| 2005/0263640 A1 | 12/2005 | Vanderslice | |
| 2006/0045458 A1 | 3/2006 | Sasaki et al. | |
| 2006/0151654 A1 | 7/2006 | Pitcher | |
| 2006/0196989 A1 | 9/2006 | Bartley et al. | |
| 2006/0264921 A1 | 11/2006 | Deutsch et al. | |
| 2007/0189829 A1 | 8/2007 | Matsushita et al. | |
| 2007/0196053 A1 | 8/2007 | Kewitsch | |
| 2007/0278227 A1 | 12/2007 | Damaghi et al. | |
| 2008/0019642 A1 | 1/2008 | Kewitsch | |
| 2008/0156922 A1 | 7/2008 | Rabinowitz et al. | |
| 2008/0273844 A1 | 11/2008 | Kewitsch | |
| 2008/0292261 A1 | 11/2008 | Kowalczyk et al. | |
| 2009/0060441 A1 | 3/2009 | Kowalczyk et al. | |
| 2009/0065629 A1 | 3/2009 | Veit | |
| 2009/0074370 A1 | 3/2009 | Kowalczyk et al. | |
| 2009/0097797 A1 | 4/2009 | Kewitsch | |
| 2009/0140093 A1 | 6/2009 | Wu | |
| 2009/0324189 A1 | 12/2009 | Hill et al. | |
| 2010/0054680 A1 | 3/2010 | Lochkovic et al. | |
| 2010/0329621 A1 | 12/2010 | Makrides-Saravanos et al. | |
| 2011/0006146 A1 | 1/2011 | Soper et al. | |
| 2011/0024543 A1 | 2/2011 | Smrha | |
| 2011/0024544 A1* | 2/2011 | Smrha | B65H 75/14 242/396.1 |
| 2011/0073700 A1 | 3/2011 | Godett et al. | |
| 2011/0085775 A1 | 4/2011 | Van Zuylen | |
| 2011/0154867 A1 | 6/2011 | Fawcett et al. | |
| 2011/0297781 A1 | 12/2011 | Peters | |
| 2012/0168554 A1 | 7/2012 | Blunt et al. | |
| 2012/0205477 A1 | 8/2012 | Whitaker | |
| 2013/0161430 A1 | 7/2013 | Weissbrod | |
| 2013/0233962 A1 | 9/2013 | Wells | |
| 2013/0284843 A1 | 10/2013 | Mertesdorf | |
| 2013/0284844 A1 | 10/2013 | Holmberg et al. | |
| 2013/0287359 A1 | 10/2013 | Haataja | |
| 2013/0306780 A1 | 11/2013 | Marcouiller et al. | |
| 2014/0027560 A1 | 1/2014 | Flood | |
| 2014/0131505 A1 | 5/2014 | Gonzalez et al. | |
| 2014/0161411 A1 | 6/2014 | Slater et al. | |

FOREIGN PATENT DOCUMENTS

| | | |
|---|---|---|
| EP | 0 531 628 A1 | 3/1993 |
| FR | 2 645 360 A1 | 10/1990 |
| FR | 2 743 359 A1 | 7/1997 |
| GB | 2 275 041 A | 8/1994 |
| JP | 2-296201 | 12/1990 |
| JP | 5-303018 | 11/1993 |
| JP | 2000-284129 | 10/2000 |
| JP | 2001-91753 | 4/2001 |
| JP | 2001-169452 | 6/2001 |
| JP | 2001-339837 | 12/2001 |
| JP | 2003-29059 | 1/2003 |
| JP | 2003-329850 | 11/2003 |
| JP | 2003-329851 | 11/2003 |
| JP | 2008-197530 | 8/2008 |
| WO | WO 99/41183 | 8/1999 |
| WO | WO 2006/015343 A2 | 2/2006 |
| WO | WO 2006/078007 A1 | 7/2006 |

OTHER PUBLICATIONS

Decoiler Devices/Traverse Arms/Accessories, http ://replay.web.archive.org/20060518044402/https://weldingsupply.securesites.com/, 4 pages (May 18, 2006).
Decoiler Devices/Traverse Arms/Accessories, https://weldingsupply.securesites.com/yeoweld-fax.html, 5 pages (Date Printed May 2, 2011).
Fiber Management, Richco, p. 211 (Date Unknown).
Fiberlaunch, 4 pages (Copyright 2010).
Fibre Fastening and Routing Components, Richco, pp. 54-72 (Date Unknown).
Fibre Winding Reel, Europlus Technologies plc, 2 pages (Date Unknown).
Still images from video located at http://www.igus.com/ApplicationComer/igus%20Videos/E-Chain/Excellent%20quality/EChainSystems_for_machinetools.wmv, 6 pages (Downloaded Dec. 2009).
Still images from video located at http://www.igus.com Dec. 8, 2009—igus_12HMInews, 3 pages (Downloaded Dec. 2009).
Telescent Catalog Fiber Optic Connectivity, pp. 1-39 (Copyright 2007).

* cited by examiner

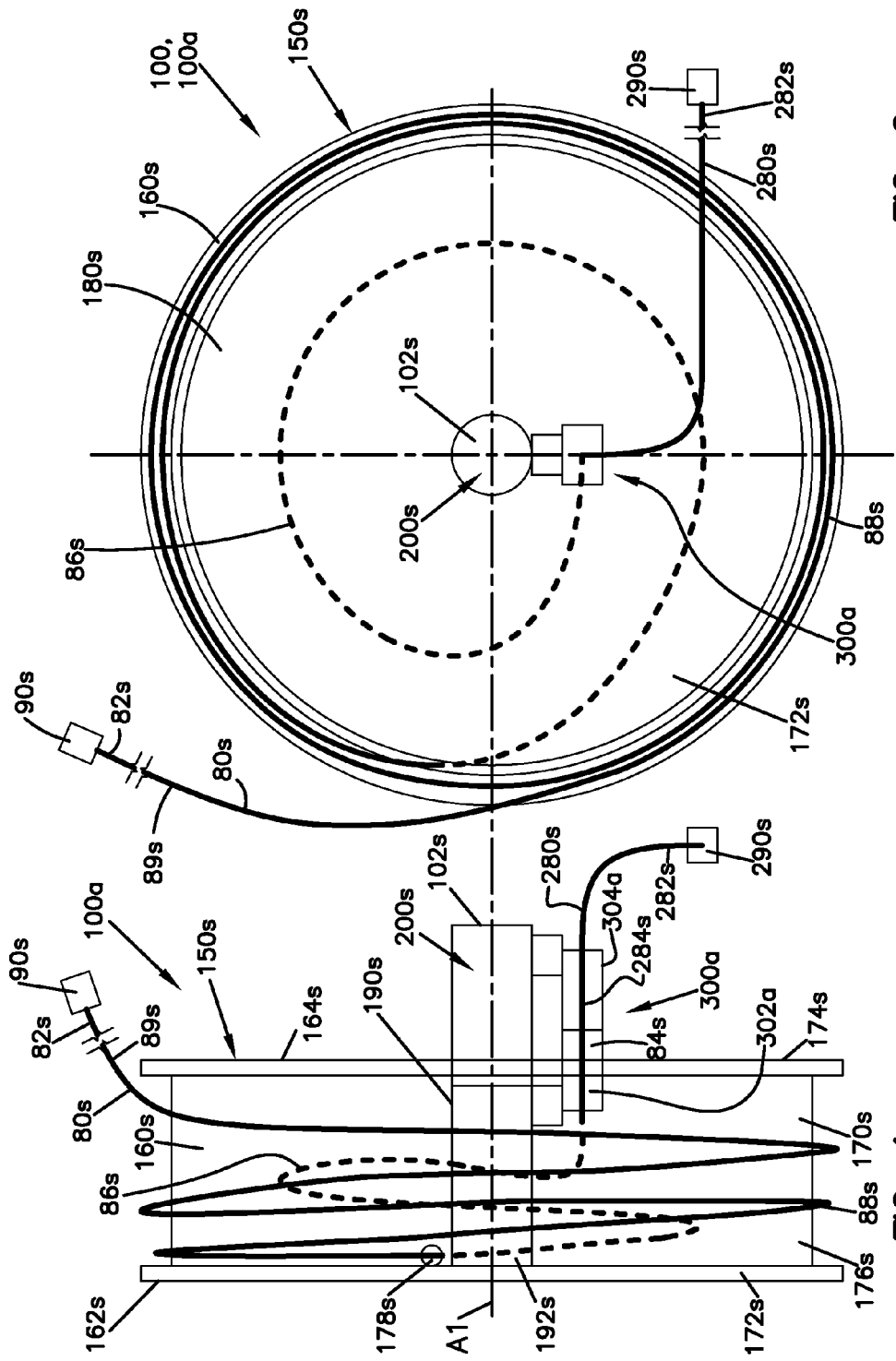

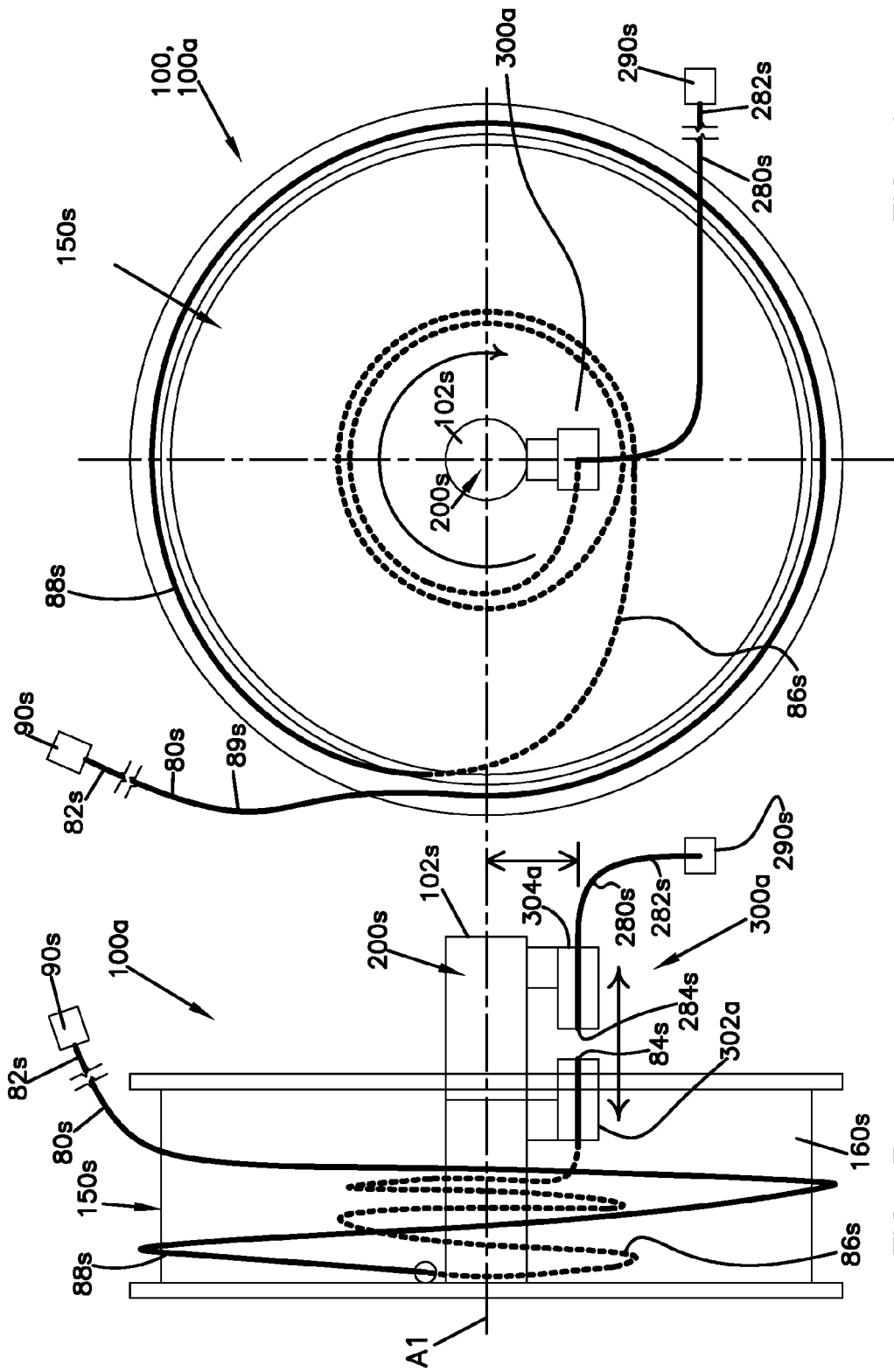

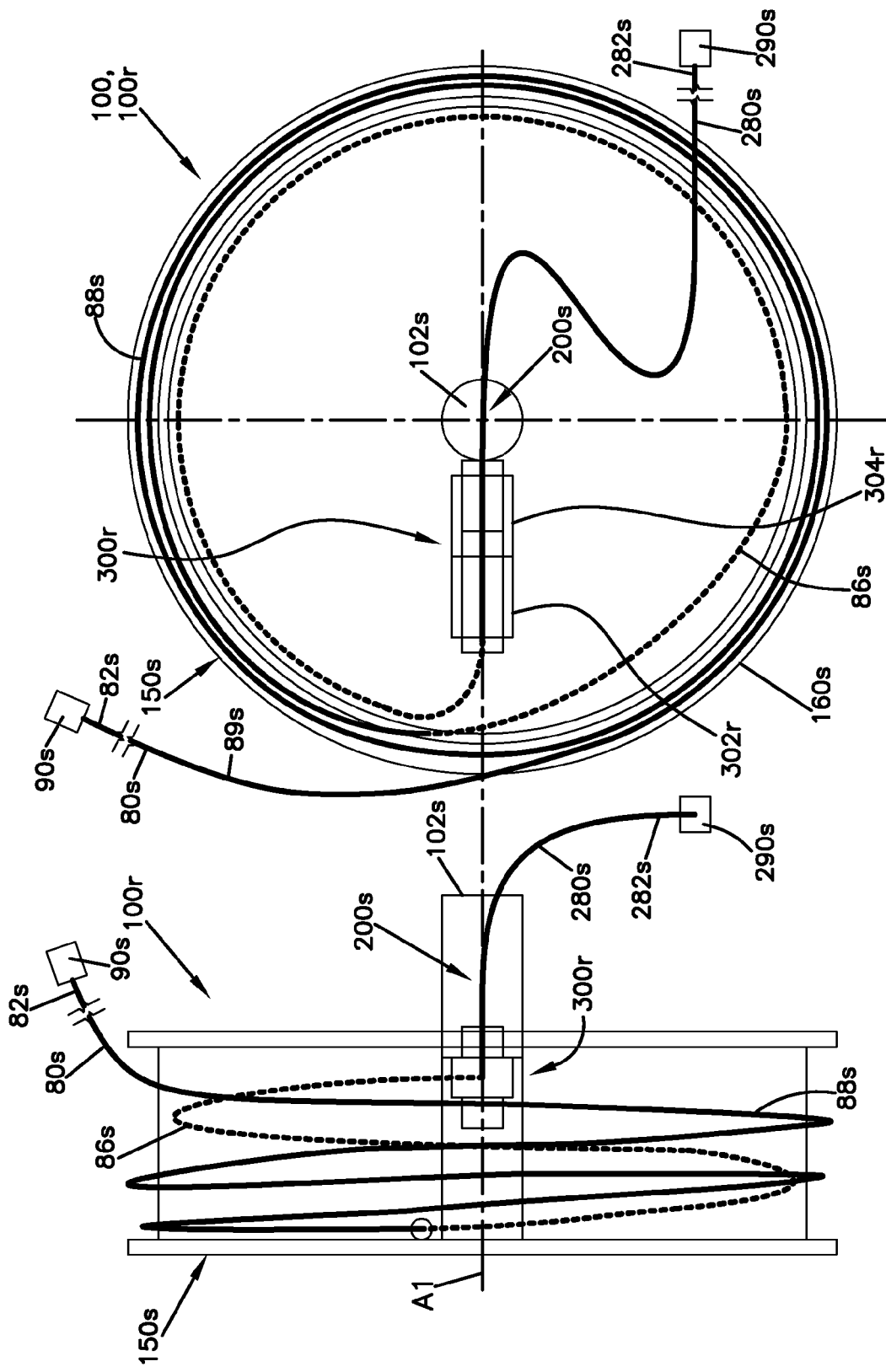

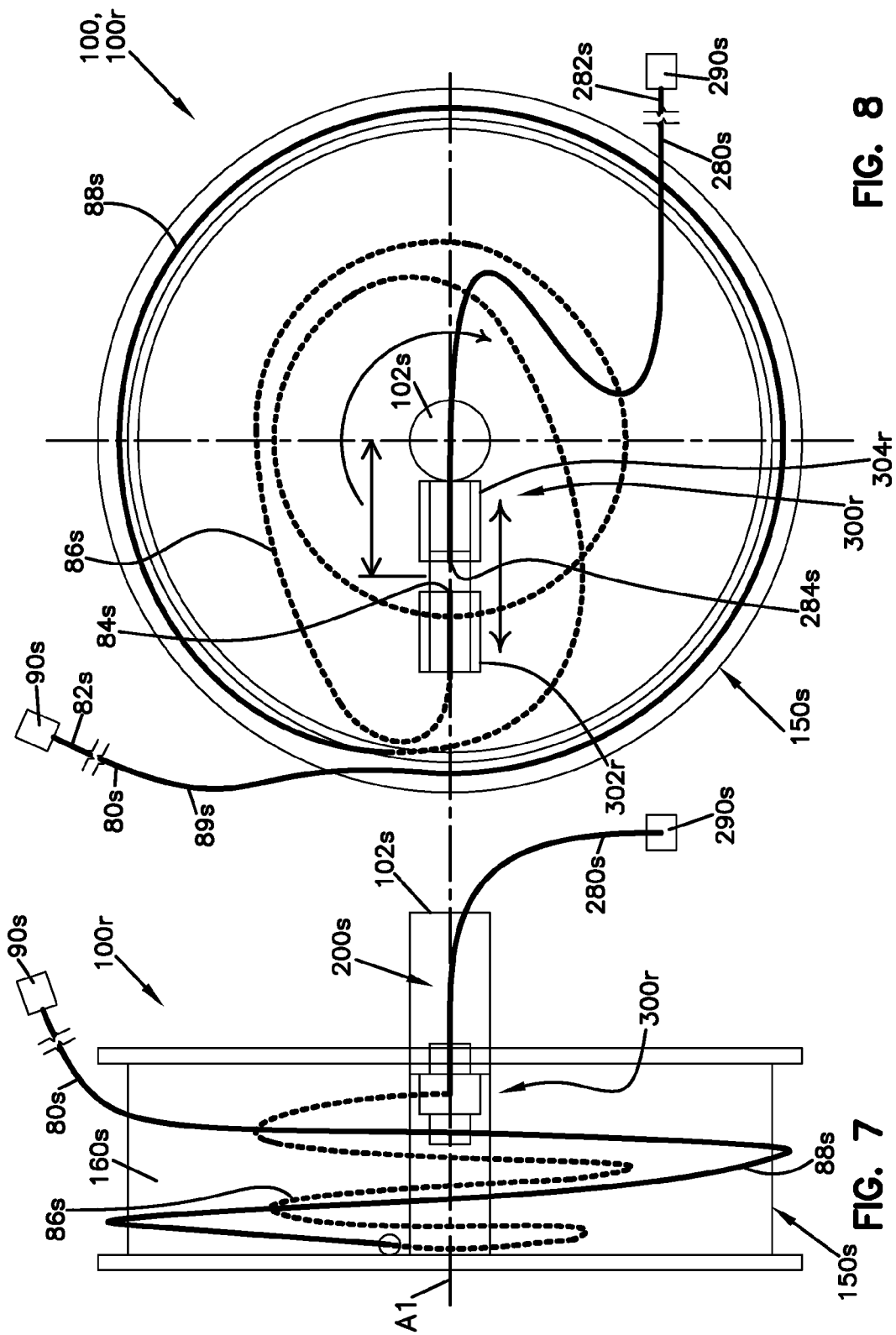

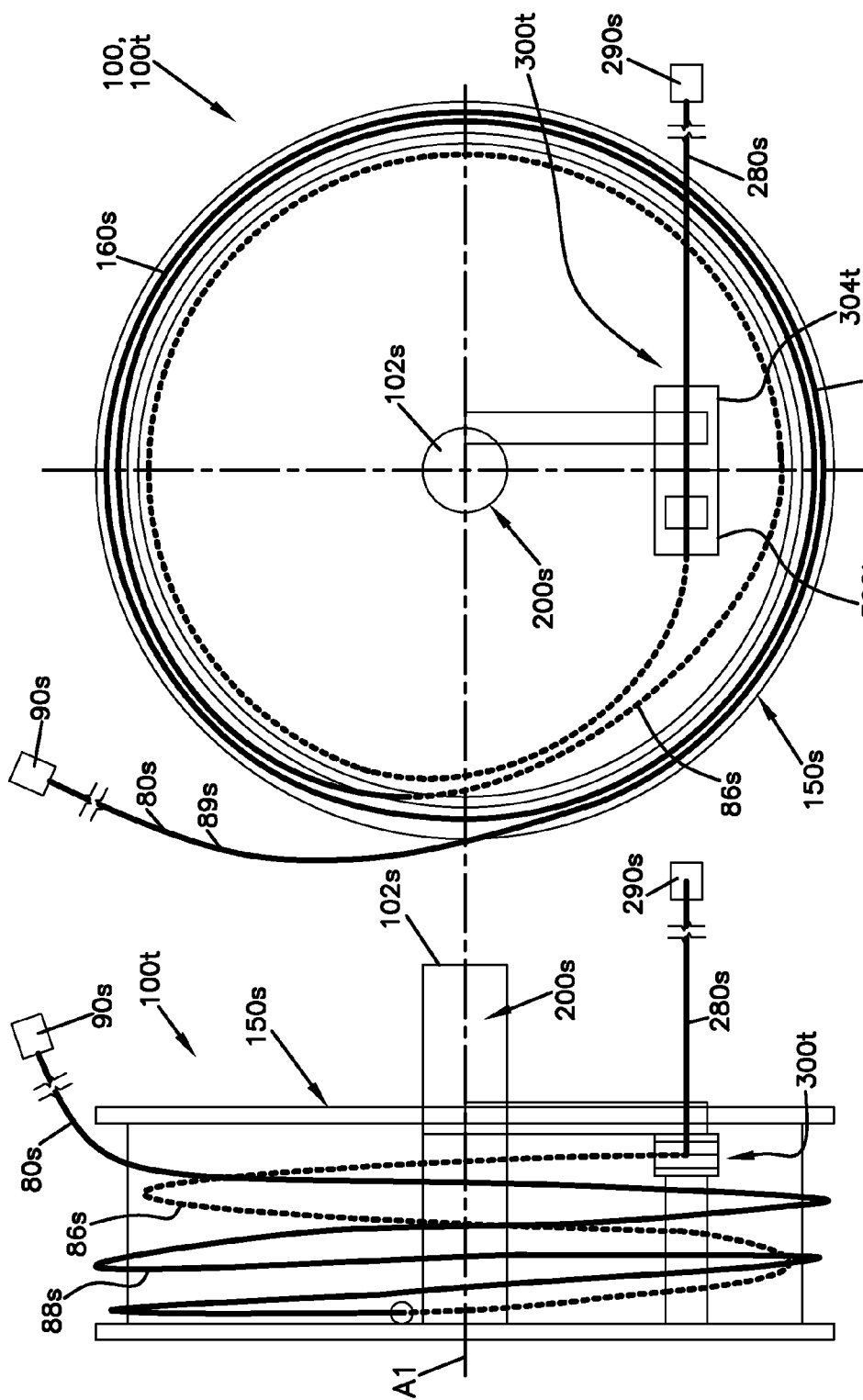

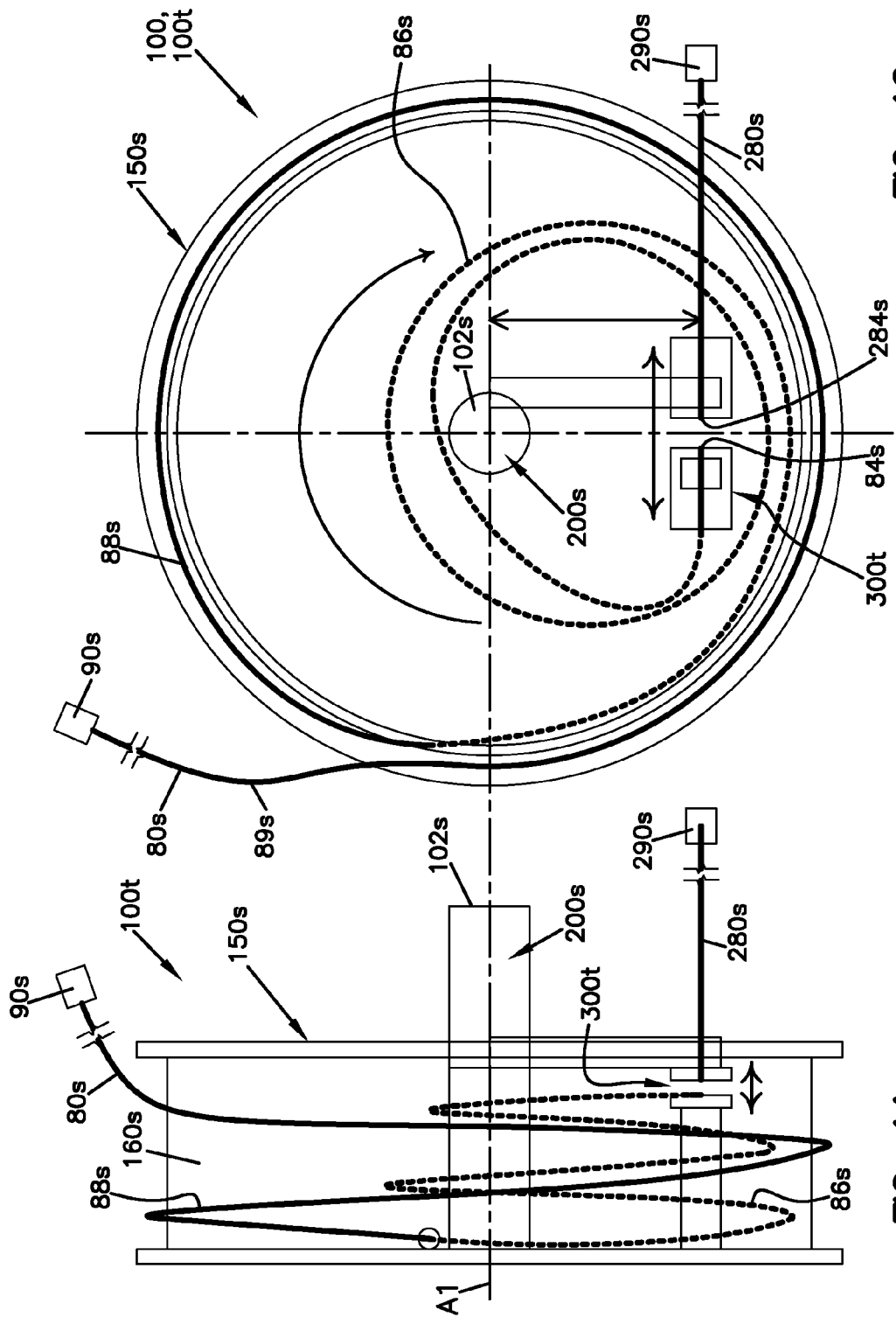

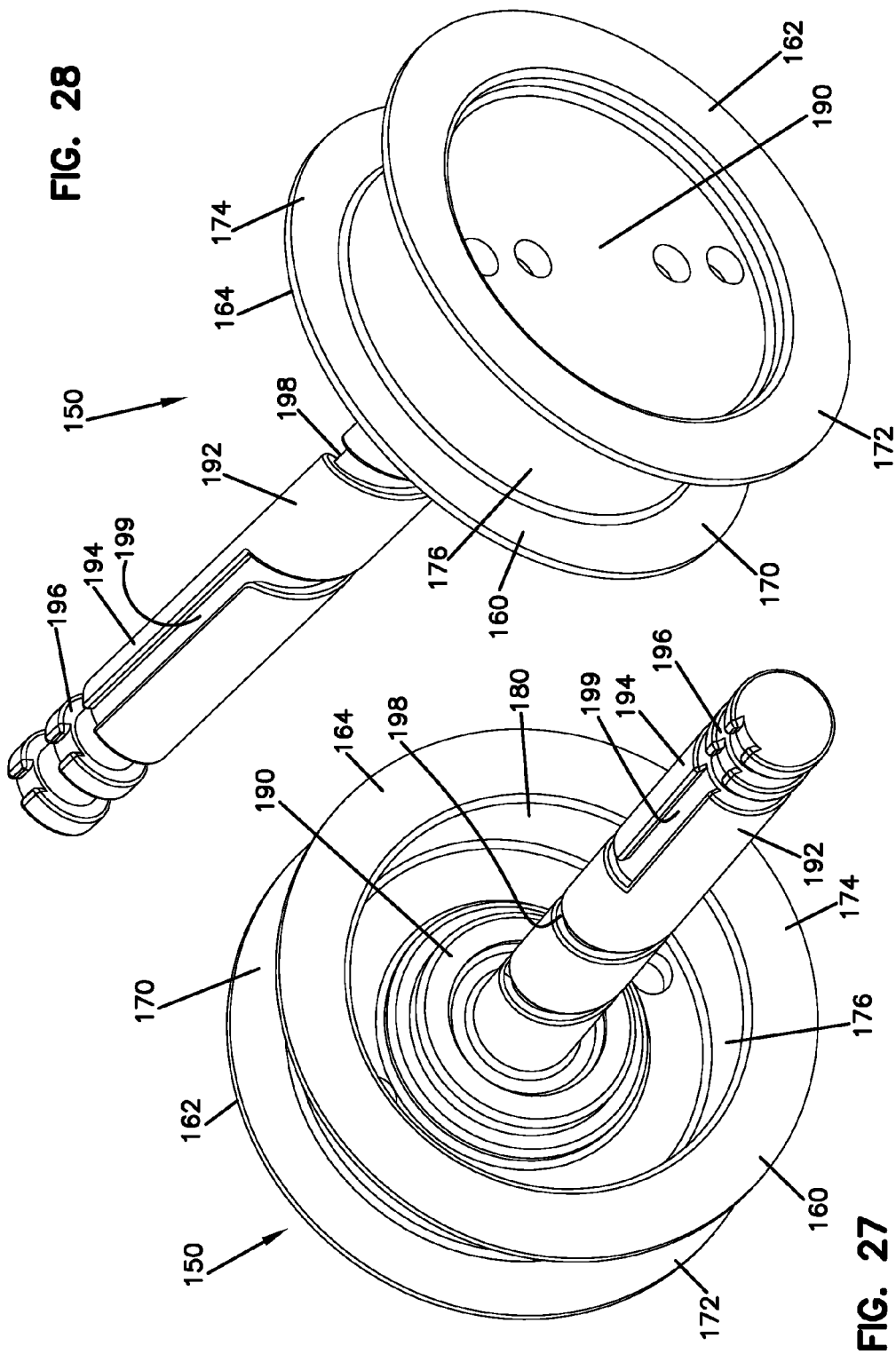

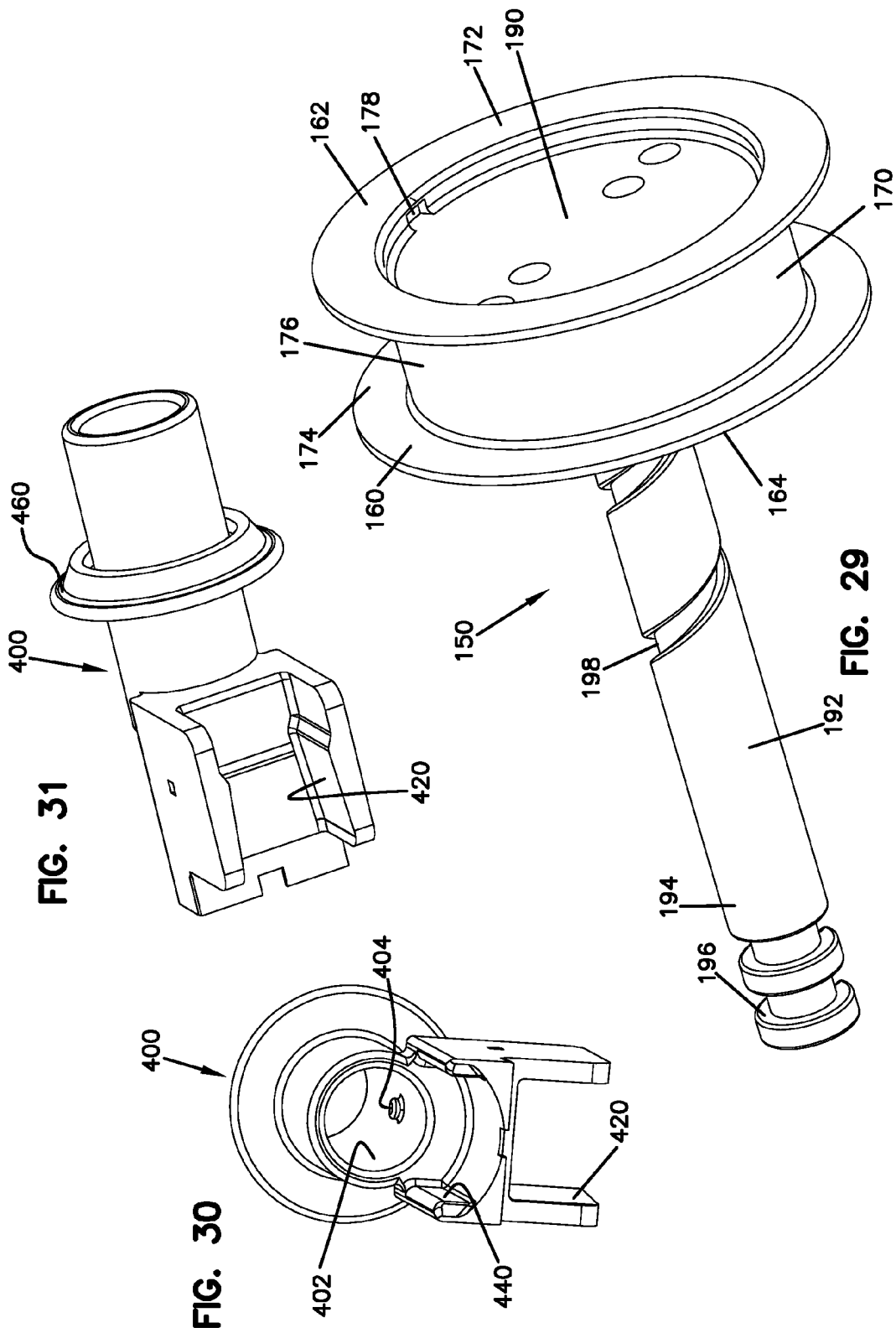

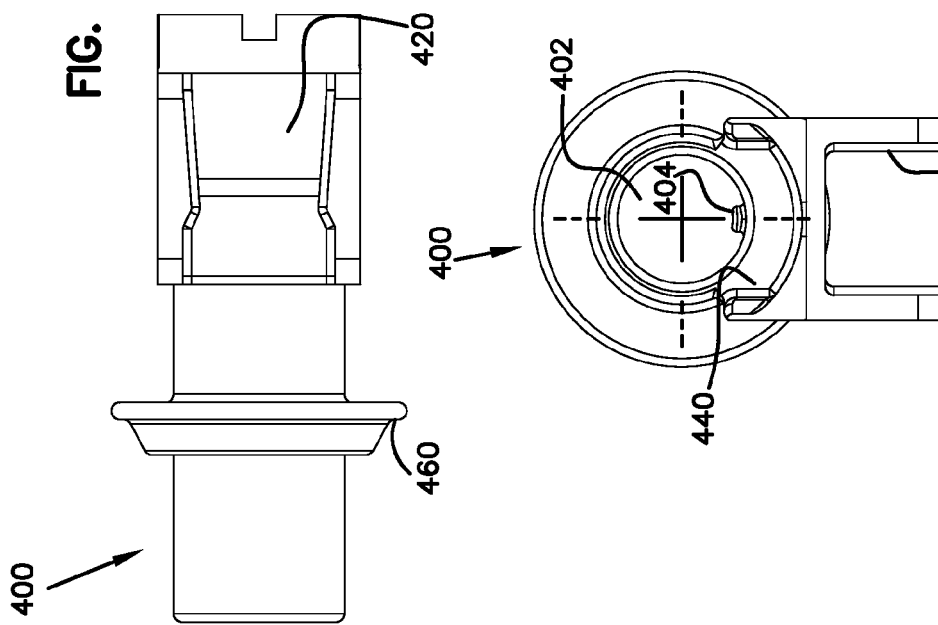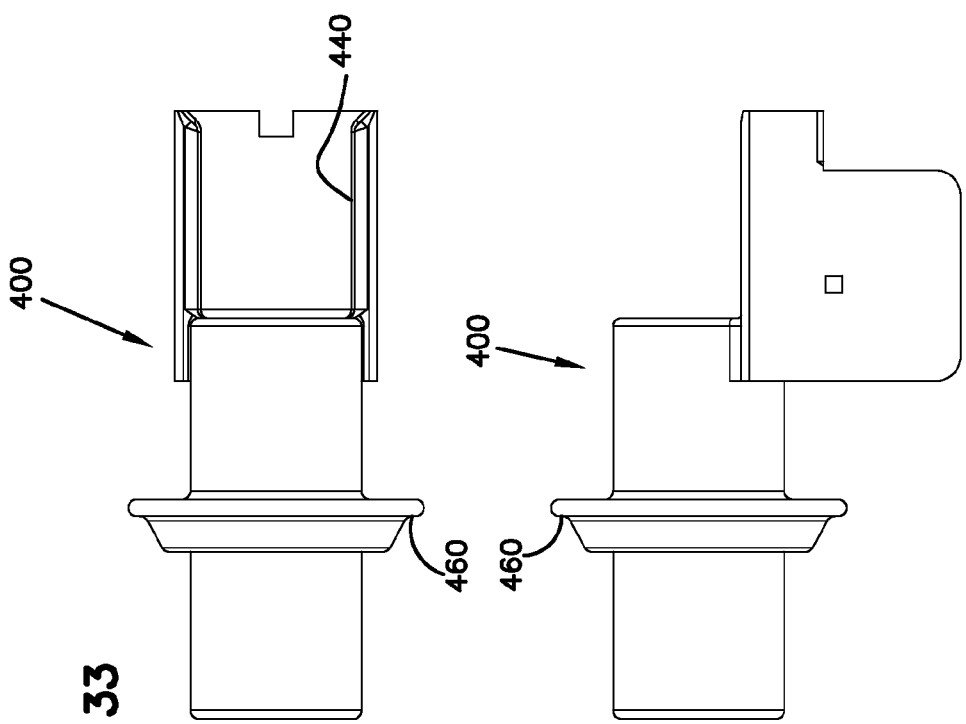

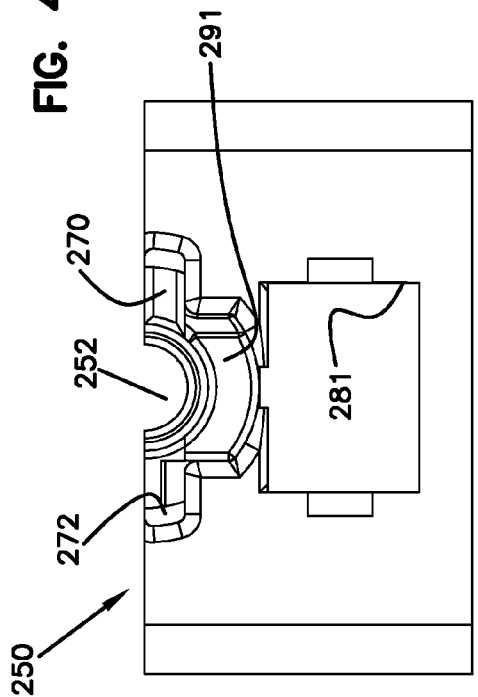
FIG. 43
FIG. 42
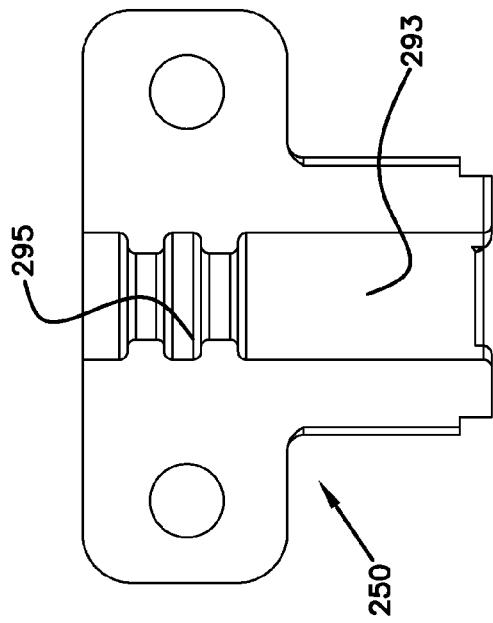
FIG. 41
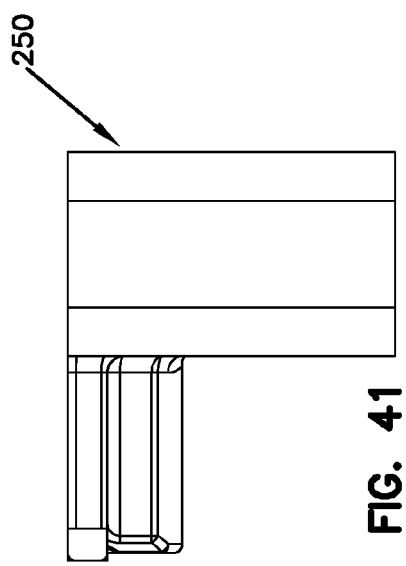
FIG. 40

OPTICAL FIBER DISCONNECT/RECONNECT APPARATUS

CROSS REFERENCE TO RELATED APPLICATIONS

This application is a continuation of U.S. application Ser. No. 13/873,709, filed Apr. 30, 2013, now U.S. Pat. No. 9,126,802, issued on Sep. 8, 2015, and entitled "PAYOUT SPOOL WITH AUTOMATIC CABLE DISCONNECT/RECONNECT", which claims the benefit of U.S. Provisional Application Ser. No. 61/640,435, filed Apr. 30, 2012, entitled "PAYOUT SPOOL WITH AUTOMATIC CABLE DISCONNECT/RECONNECT," the disclosures of which are hereby incorporated herein by reference in their entireties.

BACKGROUND

Spools or reels can be used to store telecommunications cable (e.g., electrical cable and/or fiber optic cable). The spools include a hub or a drum about which the cable is wound. The hub of the spools is often cylindrical, and the cable is often wrapped around the cylindrical hub in a predominantly circumferential manner. By winding up the cable on the spool, the cable can be compactly stored and transported, protected from tangling and kinking, and kept ready for easy deployment.

SUMMARY

An aspect of the present disclosure relates to a payout spool for a telecommunications cable. The telecommunications cable extends between a first end and a second end. The payout spool pays out the telecommunications cable when the first end of the telecommunications cable is pulled away from the payout spool. The payout spool includes a base, a spool, and a disconnect/reconnect device. The base includes a terminal for transmitting and/or receiving a telecommunication signal to and/or from the telecommunications cable. The spool is rotatably mounted to the base about an axis. The spool is adapted to unwrap the telecommunications cable about a wrapping area of the spool when the spool is rotated about the axis. The disconnect/reconnect device is adapted to disconnect the second end of the telecommunications cable from the terminal when the payout spool pays out the telecommunications cable.

Other aspects of the present disclosure may include: 1) actuating the disconnect/reconnect device, to disconnect the second end of the telecommunications cable from the terminal, by rotating the spool; 2) rotating the spool by paying out the telecommunications cable; 3) having a buffer length of the telecommunications cable paid out before the disconnect/reconnect device disconnects the second end of the telecommunications cable from the terminal; 4) paying out the buffer length of the telecommunications cable and thereby rotating the spool and thereby actuating the disconnect/reconnect device; 5) reconnecting the second end of the telecommunications cable with the terminal with the disconnect/reconnect device when the payout spool is not paying out the telecommunications cable; 6) automatically disconnecting the second end of the telecommunications cable from the terminal with the disconnect/reconnect device when the payout spool pays out the telecommunications cable; 7) automatically reconnecting the second end of the telecommunications cable with the terminal with the disconnect/reconnect device when the payout spool is not paying out the telecommunications cable; 8) rotating the spool in a single rotational direction when the telecommunications cable is unwrapped from the wrapping area; 9) wrapping the telecommunications cable about the wrapping area of the spool when the spool is rotated about the axis; 10) retracting the telecommunications cable when the first end of the telecommunications cable is released; 11) disconnecting the second end of the telecommunications cable from the terminal with the disconnect/reconnect device when the payout spool retracts the telecommunications cable; 12) mounting the payout spool with the base; 13) including a base cable with the base that connects the terminal to the disconnect/reconnect device; 14) including a wind-up portion with the telecommunications cable that extends between the disconnect/reconnect device and the wrapping area of the spool; 15) accommodating relative rotational movement between the base and the spool with the wind-up portion before the disconnect/reconnect device disconnects the second end of the telecommunications cable from the terminal; 16) positioning the wind-up portion of the telecommunications cable substantially within the wrapping area of the spool; 17) transitioning the wind-up portion of the telecommunications cable to a wrapped portion of the telecommunications cable, that is wrapped about the wrapping area, at an opening in the wrapping area; 18) including in the disconnect/reconnect device at least one latch and a release sleeve that is adapted to release the latch; 19) disconnecting the second end of the telecommunications cable from the terminal with the disconnect/reconnect device by using a movement that includes an axial component, a radial component, and/or a tangential component; 20) operating the payout spool with no electrical power and/or no external power other than that delivered by pulling on the telecommunications cable; and 21) self-powering the payout spool.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 1 is a schematic side elevation view of a payout spool with automatic cable disconnect/reconnect in a connected configuration according to the principles of the present disclosure, the automatic cable disconnect/reconnect having an axial movement;

FIG. 2 is a schematic rear elevation view of the payout spool of FIG. 1 in the connected configuration;

FIG. 3 is a schematic side elevation view of the payout spool of FIG. 1 in a disconnected configuration;

FIG. 4 is a schematic rear elevation view of the payout spool of FIG. 1 in the disconnected configuration of FIG. 3;

FIG. 5 is a schematic side elevation view of another payout spool with automatic cable disconnect/reconnect in a connected configuration according to the principles of the present disclosure, the automatic cable disconnect/reconnect having a radial movement;

FIG. 6 is a schematic rear elevation view of the payout spool of FIG. 5 in the connected configuration;

FIG. 7 is a schematic side elevation view of the payout spool of FIG. 5 in a disconnected configuration;

FIG. 8 is a schematic rear elevation view of the payout spool of FIG. 5 in the disconnected configuration of FIG. 7;

FIG. 9 is a schematic side elevation view of yet another payout spool with automatic cable disconnect/reconnect in a connected configuration according to the principles of the present disclosure, the automatic cable disconnect/reconnect having an tangential and axial movement;

FIG. 10 is a schematic rear elevation view of the payout spool of FIG. 9 in the connected configuration;

FIG. 11 is a schematic side elevation view of the payout spool of FIG. 9 in a disconnected configuration;

FIG. 12 is a schematic rear elevation view of the payout spool of FIG. 9 in the disconnected configuration of FIG. 11;

FIG. 27 is a perspective view of a spool of the payout spool of FIG. 13;

FIG. 28 is another perspective view of the spool of FIG. 27;

FIG. 29 is yet another perspective view of the spool of FIG. 27;

FIG. 30 is a perspective view of a releasing member of the payout spool of FIG. 13;

FIG. 31 is another perspective view of the releasing member of FIG. 30;

FIG. 32 is a side elevation view of the releasing member of FIG. 30;

FIG. 33 is a top plan view of the releasing member of FIG. 30;

FIG. 34 is a rear elevation view of the releasing member of FIG. 30;

FIG. 35 is a bottom plan view of the releasing member of FIG. 30;

FIG. 40 is a side elevation view of the base of FIG. 36;

FIG. 41 is an opposite side elevation view of the base of FIG. 36;

FIG. 42 is a front elevation view of the base of FIG. 36;

FIG. 43 is a top plan view of the base of FIG. 36;

DETAILED DESCRIPTION

Figure 13:
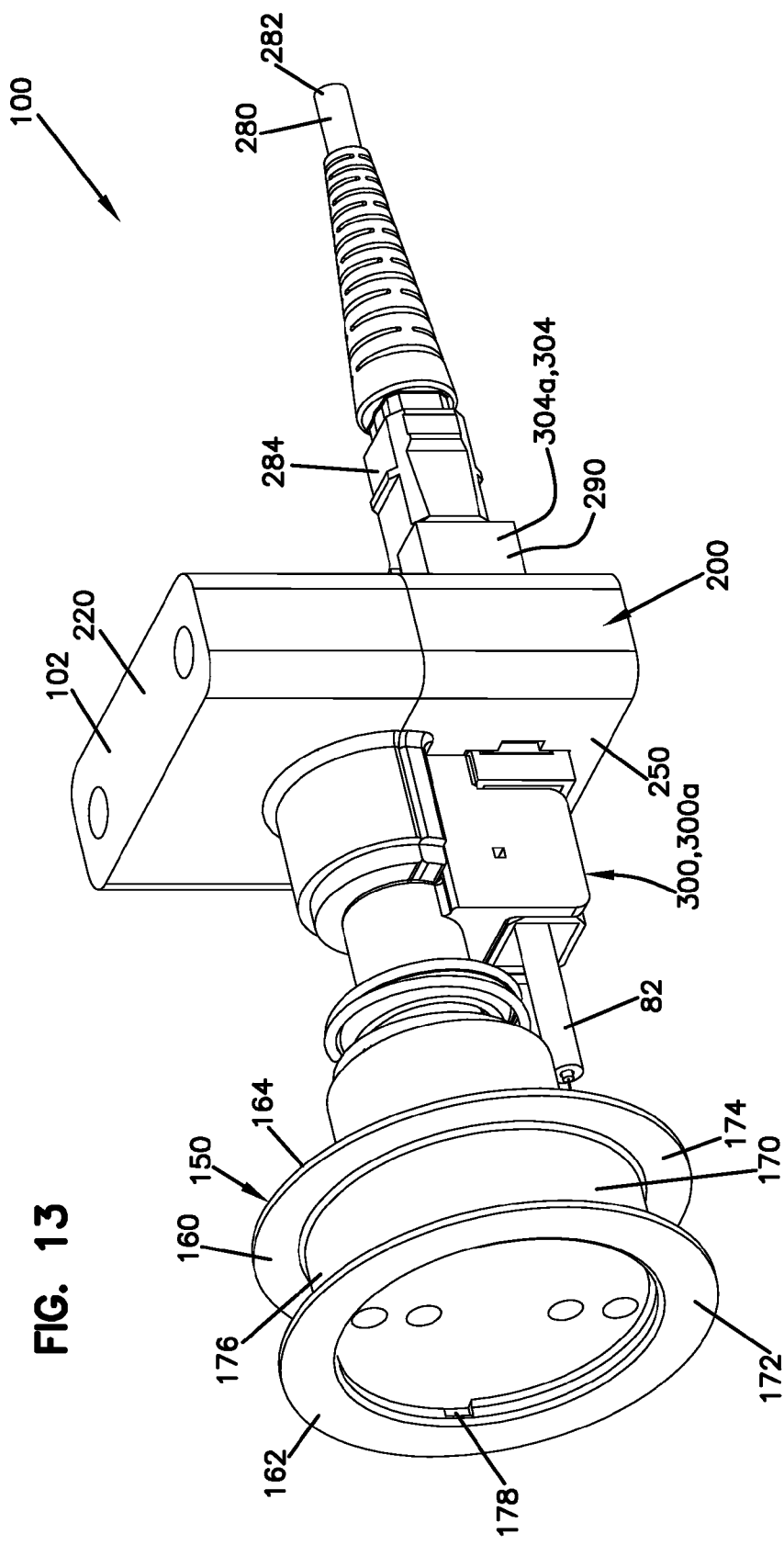
FIG. 13 is a perspective view of a payout spool with automatic cable disconnect/reconnect in a connected configuration according to the principles of the present disclosure, the automatic cable disconnect/reconnect having an axial movement generated by a disconnect/reconnect mechanism.

Reference will now be made in detail to the exemplary aspects of the present disclosure that are illustrated in the accompanying drawings. Wherever possible, the same reference numbers will be used throughout the drawings to refer to the same or like structure. In certain instances, parts and features are shown schematically and the reference numbers may be followed by an "s" to indicate this.

According to the principals of the present disclosure, a spool assembly is adapted to pay-out and reel-in a telecommunications cable. The spool assembly can pay-out and reel-in extended lengths of the telecommunications cable without manually disconnecting and connecting the telecommunications cable from a base end. In particular, a paid-out end can be pulled from the spool assembly at various lengths including the extended lengths to bring the paid-out end of the telecommunications cable to a desired location. The spool assembly does not require a rotary union or substantial accumulated twist in the telecommunications cable, but rather a connection of the spool assembly is disconnected while the spool assembly is paying-out or reeling-in the telecommunications cable. In particular, when the spool assembly begins paying-out or reeling-in the telecommunications cable, the connection is disconnected thereby freeing a portion of the telecommunications cable that is wrapped around the spool assembly from being constrained by the base end. Upon the telecommunications cable being paid-out or reeled-in, as desired, the connection is reconnected thereby allowing the paid-out end of the telecommunications cable to communicate with the base end.

Turning now to FIGS. 1-12, a spool assembly 100, according to the principles of the present disclosure, is schematically illustrated. In particular, FIGS. 1-4 schematically illustrate a spool assembly 100a, FIGS. 5-8 schematically illustrate a spool assembly 100r, and FIGS. 9-12 schematically illustrate a spool assembly 100t. The spool assemblies 100a, 100r, and 100t each include a telecommunications cable 80 (e.g., a fiber optic cable) that includes a first end 82. The first end 82 may be connectorized by a connector 90 (e.g., a fiber optic connector). The first end 82 and/or the connector 90 can be pulled from the spool assembly 100, 100a, 100r, 100t and extended to a desired location (i.e., paid-out). Likewise, the first end 82 and/or the connector 90 can be reeled-in by the spool assembly 100, 100a, 100r, 100t and positioned as desired (i.e., retracted).

As depicted, the spool assembly 100, 100a, 100r, 100t also includes a terminal 290. As depicted, the terminal 290 is not substantially extendable from the spool assembly 100, 100a, 100r, 100t. As depicted, the terminal 290 does not rotate with a spool 150 of the spool assembly 100, 100a, 100r, 100t, but is generally stationary with a mount 200 of the spool assembly 100, 100a, 100r, 100t. In certain embodiments, the terminal 290 may be fixed with the mount 200. As depicted, the terminal 290 is attached to the mount 200 by a cable 280 (i.e., a base cable). In particular, a first end 282 of the cable 280 is attached to the terminal 290. As depicted, the terminal 290 can be a fiber optic connector. In other embodiments, the terminal 290 can be a fiber optic adaptor. The terminal 290 can be permanently or semi-permanently connected to a fiber optic component, a fiber optic network, etc. If it is desired to change the position of the first end 82 and/or the connector 90, the terminal 290 can remain connected to the fiber optic component, the fiber optic network, etc.

To accommodate the first end 82 and/or the connector 90 changing position, particularly when the change in position results in a difference in length between the terminal 290 and the first end 82 and/or the connector 90, the terminal 290 is disconnected from the telecommunications cable 80, thereby allowing the spool 150 to spin and pay-out or reel-in the telecommunications cable 80.

In the depicted embodiment, the telecommunications cable 80 extends between the first end 82 and a second end 84, and the cable 280 extends between the first end 282 and a second end 284. The second end 84 and the second end 284 meet each other at a disconnect/reconnect device 300. As illustrated at FIGS. 1-4, the disconnect/reconnect device 300 is an axial disconnect/reconnect device 300a, as illustrated at FIGS. 5-8, the disconnect/reconnect device 300 is a radial disconnect/reconnect device 300r, and as illustrated at FIGS. 9-12, the disconnect/reconnect device 300 is a tangential disconnect/reconnect device 300t. In each of the illustrated embodiments, the disconnect/reconnect device 300, 300a, 300r, 300t facilitates the connection, disconnection, and reconnection of the second end 84 and the second end 284. In particular, as illustrated at FIGS. 1, 6, 9, and 10, the second end 284 and the second end 84 are connected (e.g., optically connected). As illustrated at FIGS. 3, 8, 11, and 12, the second end 284 and the second end 84 are disconnected (i.e., optically disconnected). In preferred embodiments, the spool 150 actuates the disconnect/reconnect device 300, 300a, 300r, 300t to connect, disconnect, and reconnect the second end 284 and the second end 84.

As illustrated at FIGS. 1, 3, 5, 7, 9, 11, 13, and 27-29, the spool 150 includes a spool body 160. The spool body 160 extends between a first side 162 and a second side 164. A first flange 172 may be positioned at the first side 162, and a second flange 174 may be positioned at the second side 164. A cylindrical surface 176 may extend between the first flange 172 and the second flange 174. A wrapping area 170 may be included on the cylinder 176. The wrapping area 170 may serve as a surface to wrap and unwrap the telecommunications cable 80 from the spool 150. The telecommunications cable 80 may be wrapped and unwrapped from the wrapping area 170 a single layer deep or multiple layers deep. By wrapping the telecommunications cable 80 on the wrapping area 170, substantial lengths of the telecommunications cable 80 may be stored on the spool 150. A significant portion of the length of the telecommunications cable 80 wrapped about the wrapping area 170 may be deployed (i.e., extended from the spool 150) when it is desired that the first end 82 and/or the connector 90 be positioned a significant distance away from the terminal 290.

The telecommunications cable 80 thereby includes a wrapped portion 88 that is wrapped about the wrapping area 170. The telecommunications cable 80 further includes a deployed portion 89 that extends between the wrapping area 170 and the first end 82 when the first end 82 is spaced from the wrapping area 170. As depicted, the telecommunications cable 80 also includes a wind-up portion 86 that accommodates a limited amount of rotational movement between the spool 150 and the mount 200. The wind-up portion 86 thereby accommodates the rotational movement of the spool 150 that may be required to actuate the disconnect/reconnect device 300, 300a, 300r, 300t. In the depicted embodiment, the wind-up portion 86 is positioned within a coiling area 180. As depicted, the coiling area 180 is positioned within the cylindrical surface 176 of the spool 150 (see FIG. 2).

In the depicted embodiments, the wind-up portion 86 and the wrapped portion 88 meet each other and transition between each other at an opening 178. In the depicted embodiment, the opening 178 is positioned on the wrapping area 170. The telecommunications cable 80 may be fixed to the opening 178, or the telecommunications cable 80 may slip through the opening 178.

In the depicted embodiments, the spool 150 includes a hub 190. The hub 190 is rotatably mounted to the mount 200 thereby allowing the spool 150 to spin about the mount 200. As depicted, a first part 302, 302a, 302r, 302t of the disconnect/reconnect device 300, 300a, 300r, 300t is attached to the hub 190 of the spool 150. A second part 304, 304a, 304r, 304t is attached to the mount 200.

When the spool 150 rotates, the mount 200 generally remains stationary. Therefore, the first part 302, 302a, 302r, 302t generally rotates with the spool 150 and the second part 304, 304a, 304r, 304t generally remains stationary with the mount 200. However, the first part 302, 302a, 302r, 302t may slide with respect to the hub 190, and the second part 304, 304a, 304r, 304t may slide relative to the mount 200. This sliding action may be used when actuating the disconnect/reconnect device 300, 300a, 300r, 300t.

In the depicted embodiments, the disconnect/reconnect device 300, 300a, 300r, 300t may remain initially connected when the spool 150 begins to rotate relative to the mount 200. Likewise, the disconnect/reconnect device 300, 300a, 300r, 300t may remain connected during initial rotational movements between the spool 150 and the mount 200. In this situation, the first part 302, 302a, 302r, 302t does not initially rotate with the spool 150. Rotation of the spool 150 may actuate the disconnect/reconnect device 300, 300a, 300r, 300t. Upon the disconnect/reconnect device 300, 300a, 300r, 300t disconnecting the first part 302, 302a, 302r, 302t from the second part 304, 304a, 304r, 304t, the second part 304, 304a, 304r, 304t is free to rotate with the spool 150. The first part 302, 302a, 302r, 302t generally holds the second end 84 of the telecommunications cable 80, and the second part 304, 304a, 304r, 304t generally holds the second end 284 of the cable 280.

Figure 14:
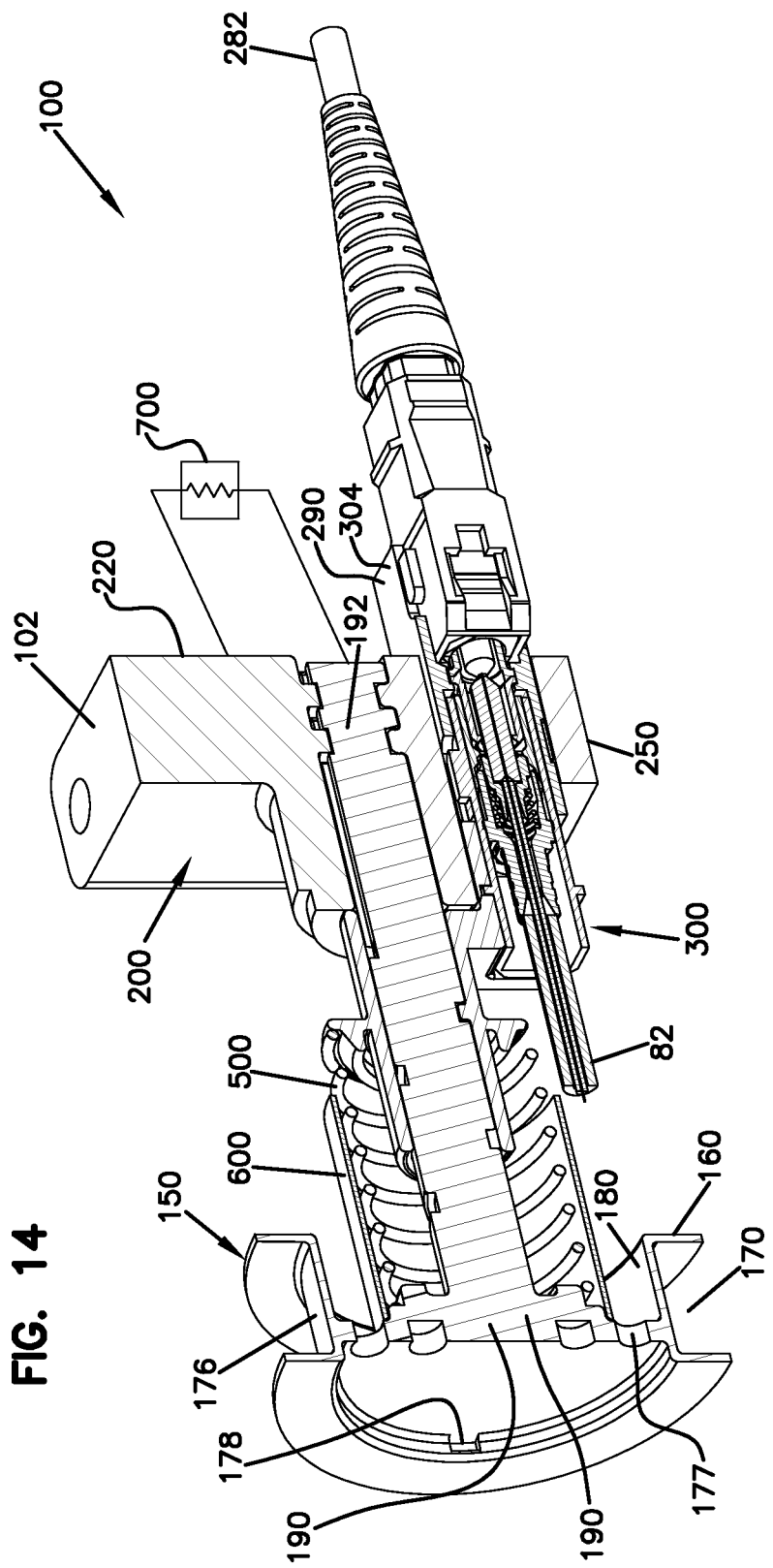
FIG. 14 is the perspective view of FIG. 13, but with the payout spool cutaway revealing a cross-section of the disconnect/reconnect mechanism.
Figure 15:
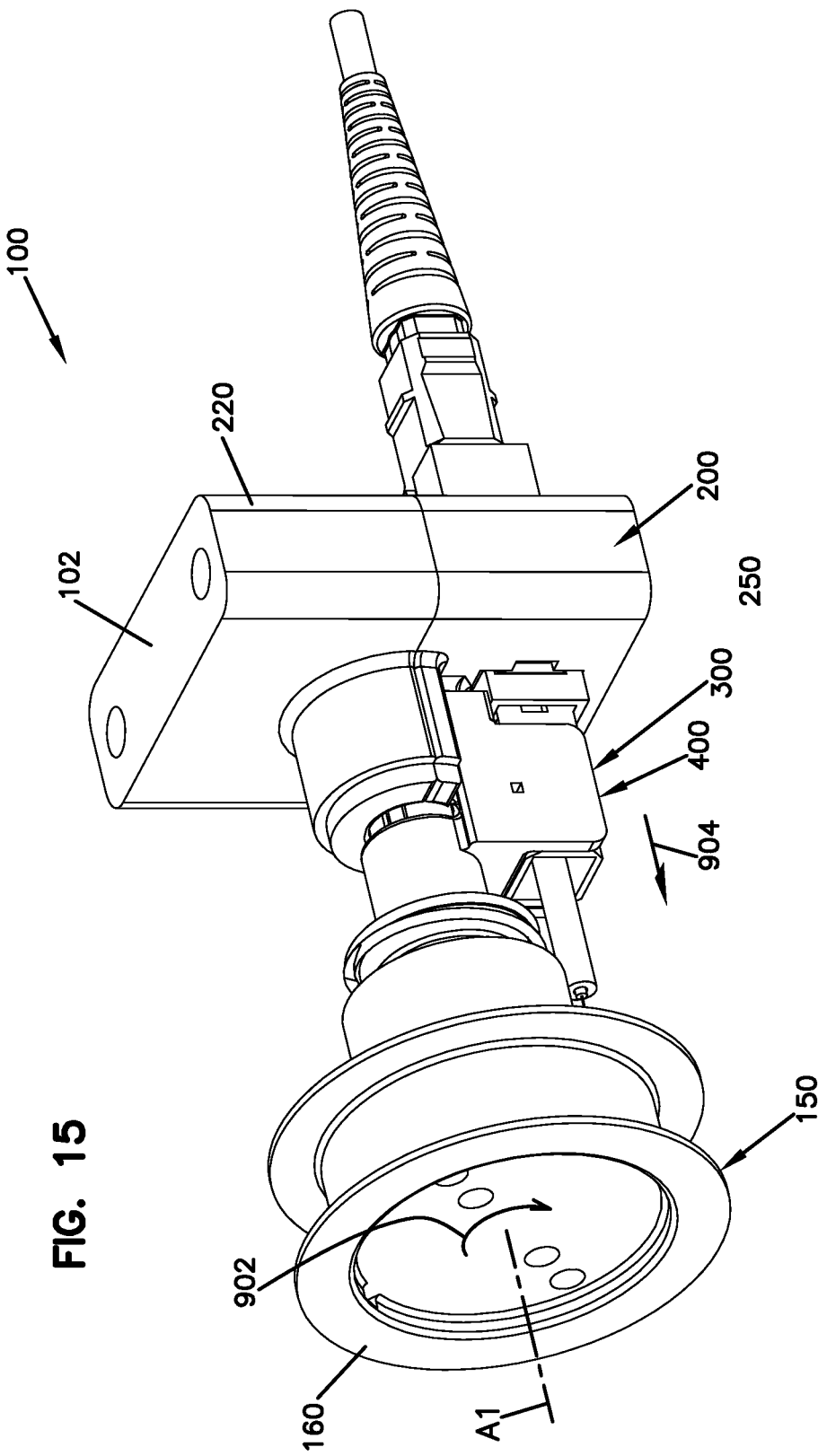
FIG. 15 is the perspective view of FIG. 13, but with the disconnect/reconnect mechanism positioning a release sleeve of a fiber optic connector in a releasing configuration.
Figure 16:
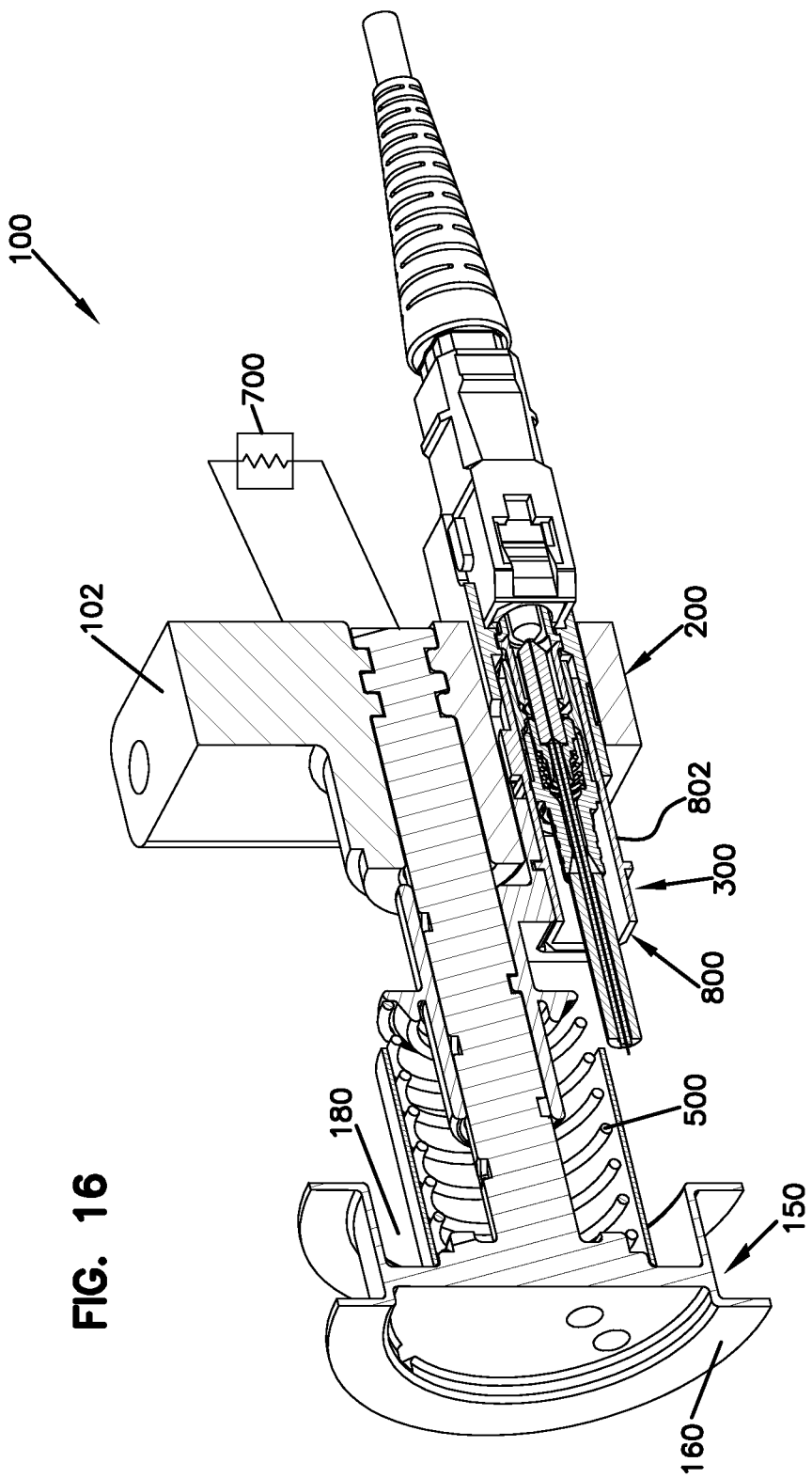
FIG. 16 is the perspective view of FIG. 15, but with the payout spool cutaway revealing the cross-section of the disconnect/reconnect mechanism of FIG. 14.

Turning now to FIGS. 13-26, an example embodiment of the spool assembly 100 is illustrated. As illustrated at FIG. 13, the terminal 290 of the spool assembly 100 may be directly mounted to the mount 200. Or, the cable 280 may be connected to the second part 304 of the disconnect/reconnect device 300 and the terminal 290 may be remotely connected via the first end 282 of the cable 280. As illustrated at FIG. 14, the second part 304 of the disconnect/reconnect device 300 may be directly mounted to the mount 200. In the embodiment depicted at FIGS. 13-26, the disconnect/reconnect device 300 generally has an axial movement and therefore is an example embodiment of the axial disconnect/reconnect device 300a.

In the depicted embodiment of FIGS. 13-26, the spool 150 includes the spool body 160 with the first side 162 and the second side 164. The first flange 172 is positioned at the first side 162, and the second flange 174 is positioned at the second side 164. The cylindrical surface 176 extends between the first flange 172 and the second flange 174. A shaft 192 extends from the hub 190. The shaft 192 includes a bearing 194 and a thrust bearing 196. The bearing 194 and/or the thrust bearing 196 may engage the mount 200. In particular, the bearing 194 may provide rotational support for the spool 150, and the thrust bearing 196 may provide axial (i.e., thrust) support for the spool 150. The shaft 192 further includes a thread 198 (see FIGS. 27-29) and an assembly channel 199.

Figure 39:
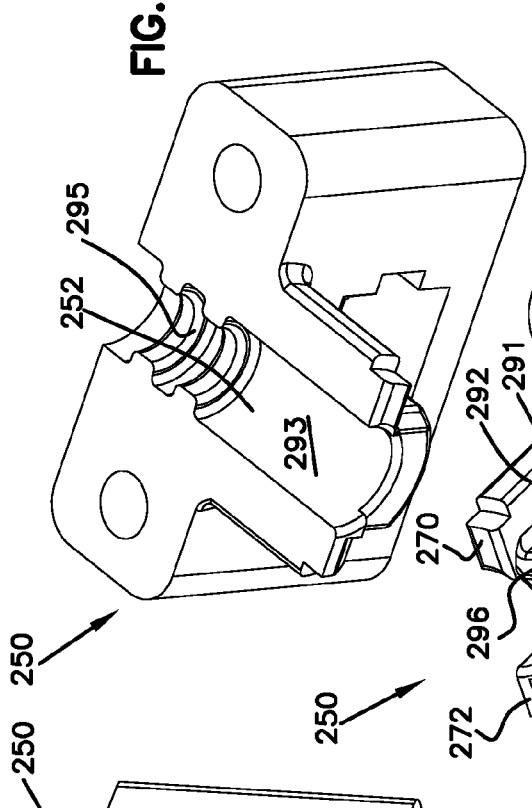
FIG. 39 is yet another perspective view of the base of FIG. 36.
Figure 38:
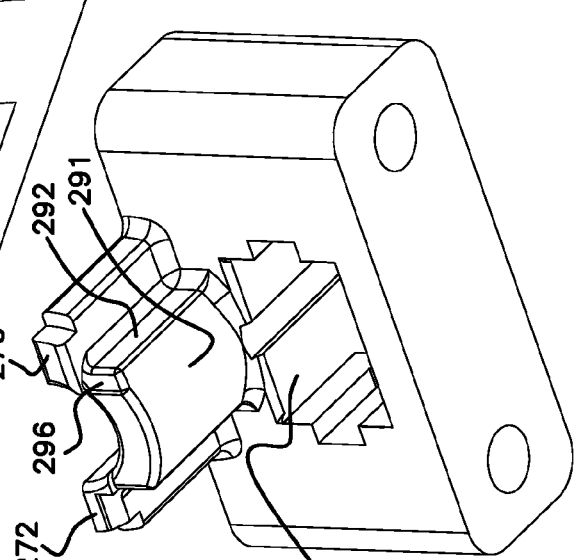
FIG. 38 is still another perspective view of the base of FIG. 36.
Figure 37:
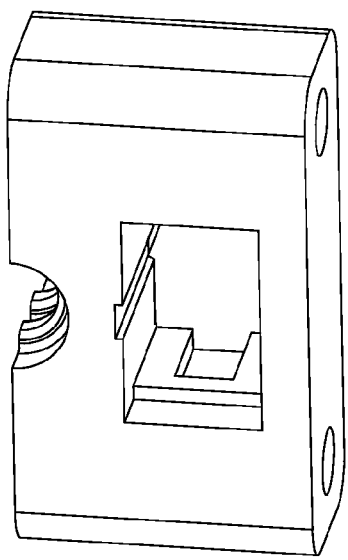
FIG. 37 is another perspective view of the base of FIG. 36.
Figure 36:
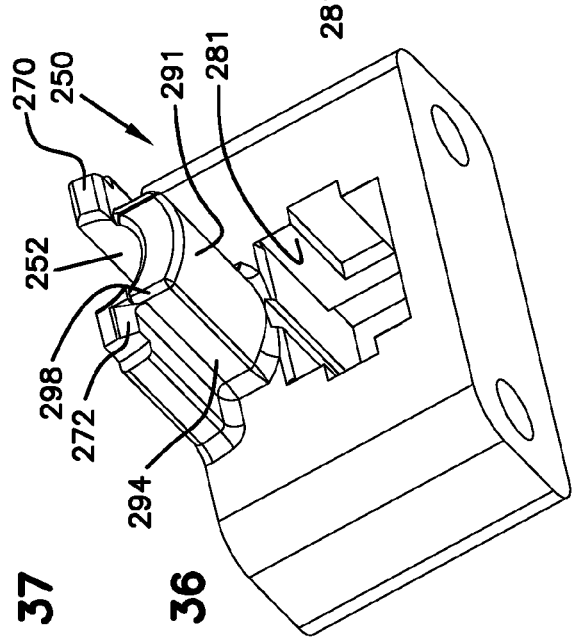
FIG. 36 is a perspective view of a base of the payout spool of FIG. 13.
Figure 47:
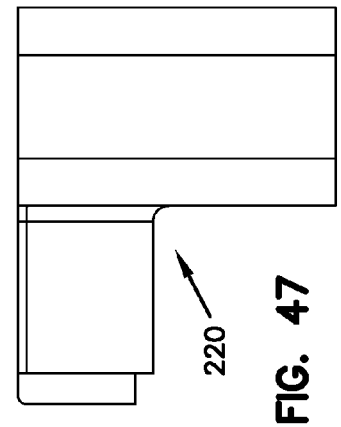
FIG. 47 is a side elevation view of the base cap of FIG. 44.
Figure 46:
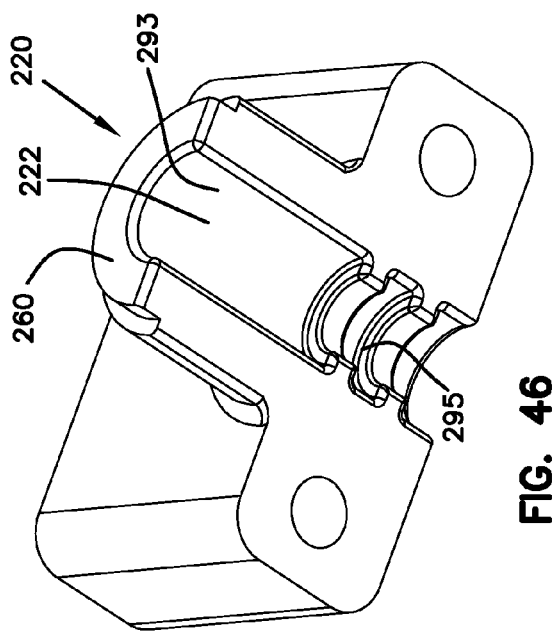
FIG. 46 is another perspective view of the base cap of FIG. 44.
Figure 45:
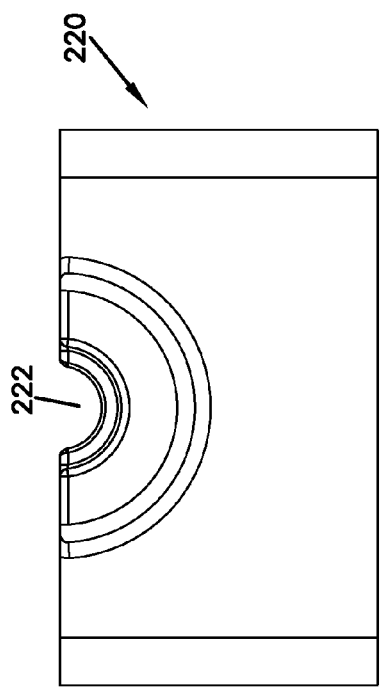
FIG. 45 is a front elevation view of the base cap of FIG. 44.
Figure 44:
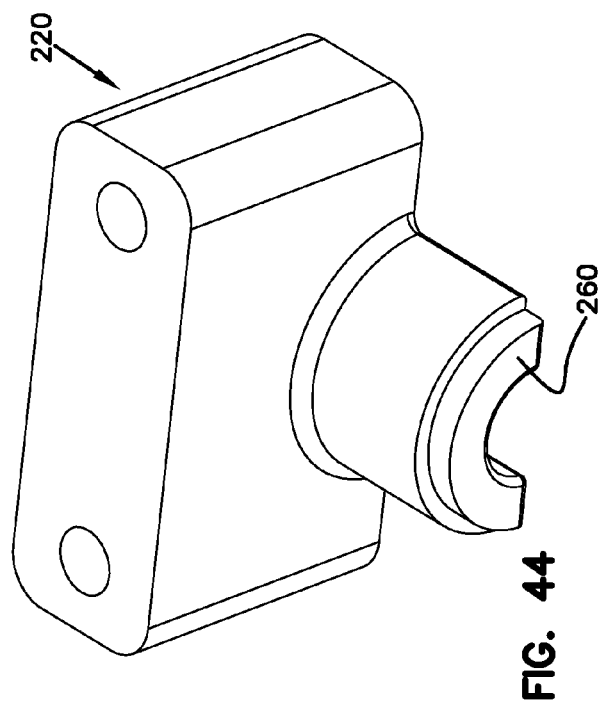
FIG. 44 is a perspective view of a base cap of the payout spool of FIG. 13.

In the embodiment depicted at FIGS. 13-26, the mount 200 includes a first piece 220 and a second piece 250. As depicted, the first piece 220 and the second piece 250 are split about a hole 202 of the mount 200. In other embodiments, the mount 200 can be a single piece mount. The mount 200 includes a bearing 293 and a thrust bearing 295 (see FIGS. 39, 43, and 46). The mount 200 further includes a thrust surface 260 (see FIGS. 44 and 46). The mount 200 further includes a first engagement feature 270 and a second engagement feature 272 (see FIGS. 36, 38, and 42). The mount 200 further includes a mount 281 for the second part 304 of the disconnect/reconnect device 300 (see FIGS. 36, 38, and 42). As depicted, the mount 200 may include mounting holes. The mounting holes may also be used to join the first piece 220 to the second piece 250. The first piece 220 may include a half-hole 222 and the second piece 250 may include a half-hole 252. The half-hole 222 and the half-hole 252 may together define the hole 202. The mount 200 may further include a slide 291. The slide 291 may have a first side 292 and a second side 294 (see FIGS. 36 and 38). A first guide feature 296 may transition into the first side 292, and a second guide feature 298 may transition into the second side 294.

The embodiment illustrated at FIGS. 13-26 includes an actuating member 400 (see FIGS. 30-35). The actuating member 400 includes a bearing surface 402 (e.g. a hole). A thread engaging feature 404 may be positioned within the bearing surface 402. The actuating member 400 may further include a mount 420 for mounting the first part 302 of the disconnect/reconnect device 300. In the depicted embodiment, the mount 420 is adapted to mount an SC connector, as shown. In particular, the mount 420 is adapted to mount a release sleeve of the SC connector. The actuating member 400 further includes a guide 440. In the depicted embodiment, the guide 440 includes parallel sides and is generally shaped like a channel. In the depicted embodiment the guide 440 further includes a spring seat 460. The spring seat 460 may include a centering feature for centering a spring.

Figure 22:
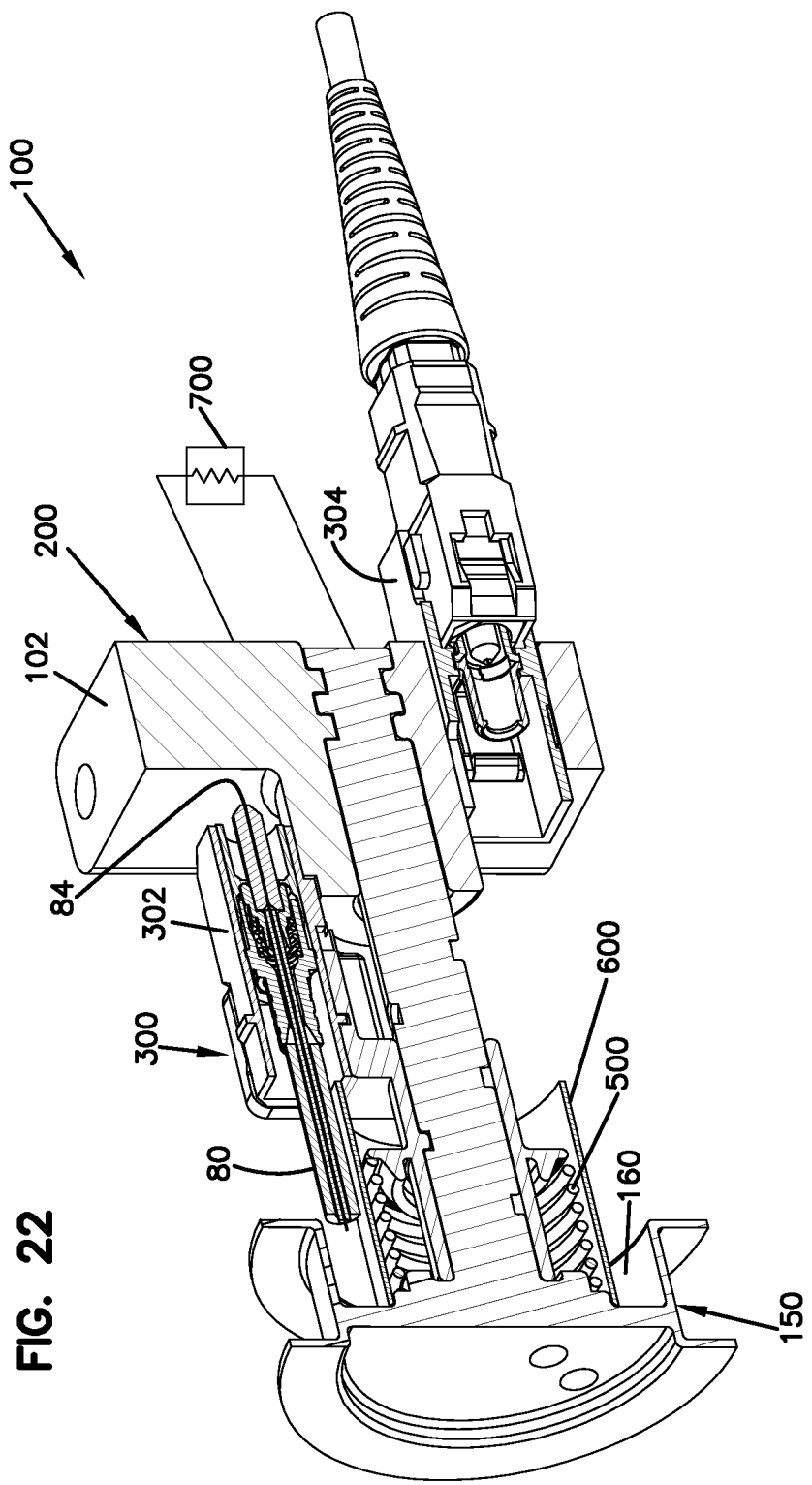
FIG. 22 is the perspective view of FIG. 21, but with the payout spool cutaway revealing the cross-section of the disconnect/reconnect mechanism of FIG. 14.
Figure 23:
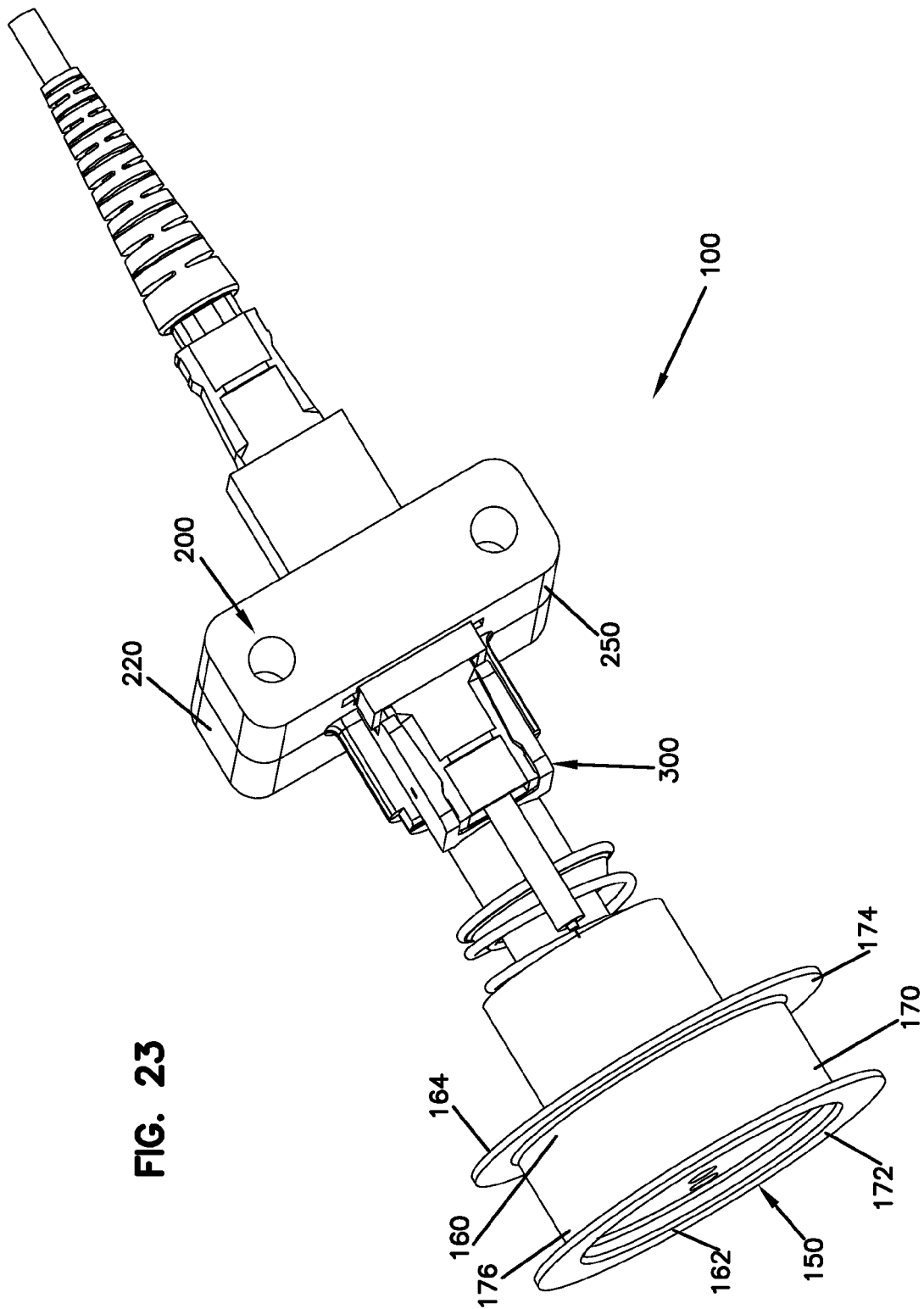
FIG. 23 is a perspective view of the payout spool of FIG. 13 with the automatic cable disconnect/reconnect in the connected configuration.
Figure 24:
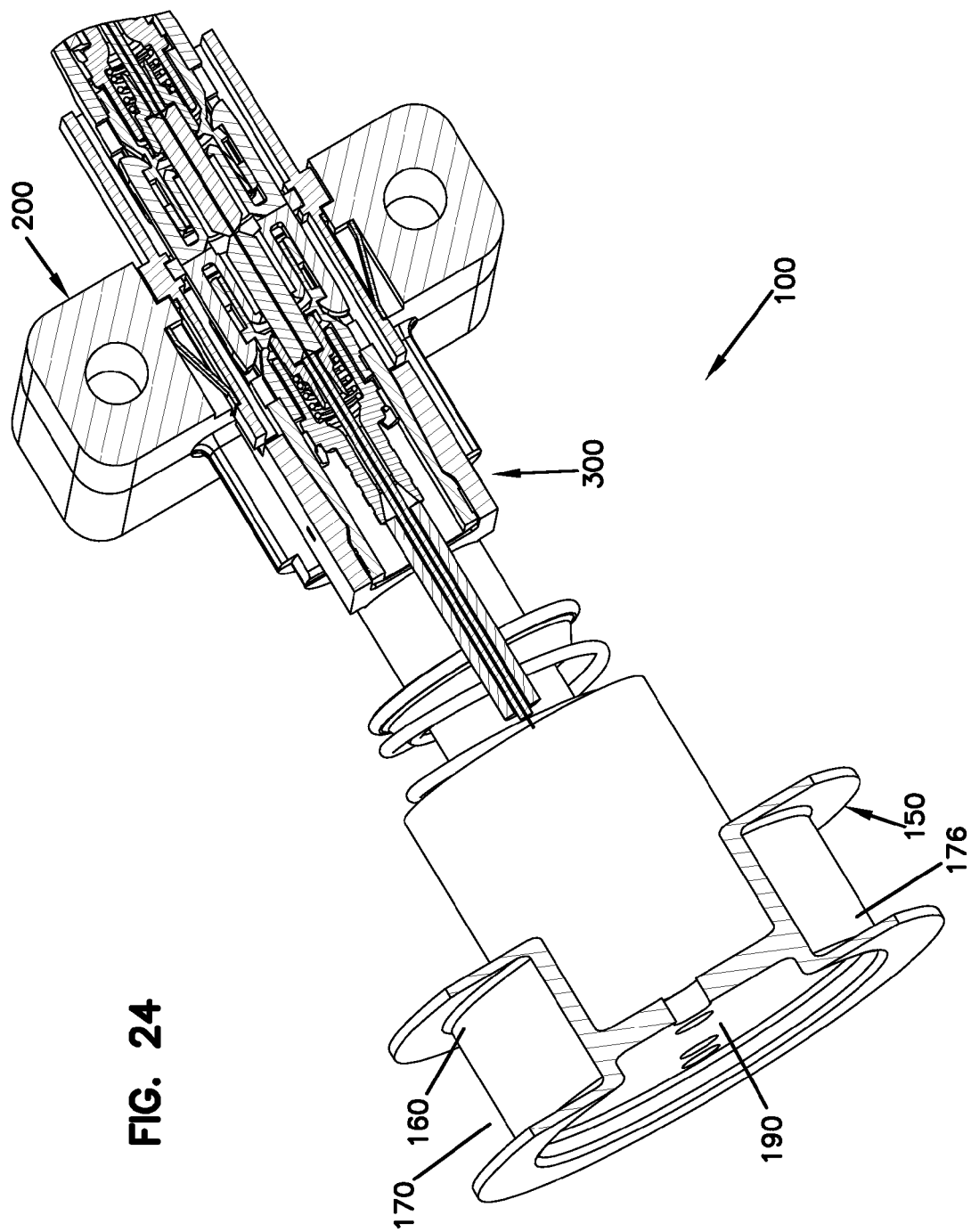
FIG. 24 is the perspective view of FIG. 23, but with the payout spool cutaway revealing a cross-section of the disconnect/reconnect mechanism.
Figure 25:
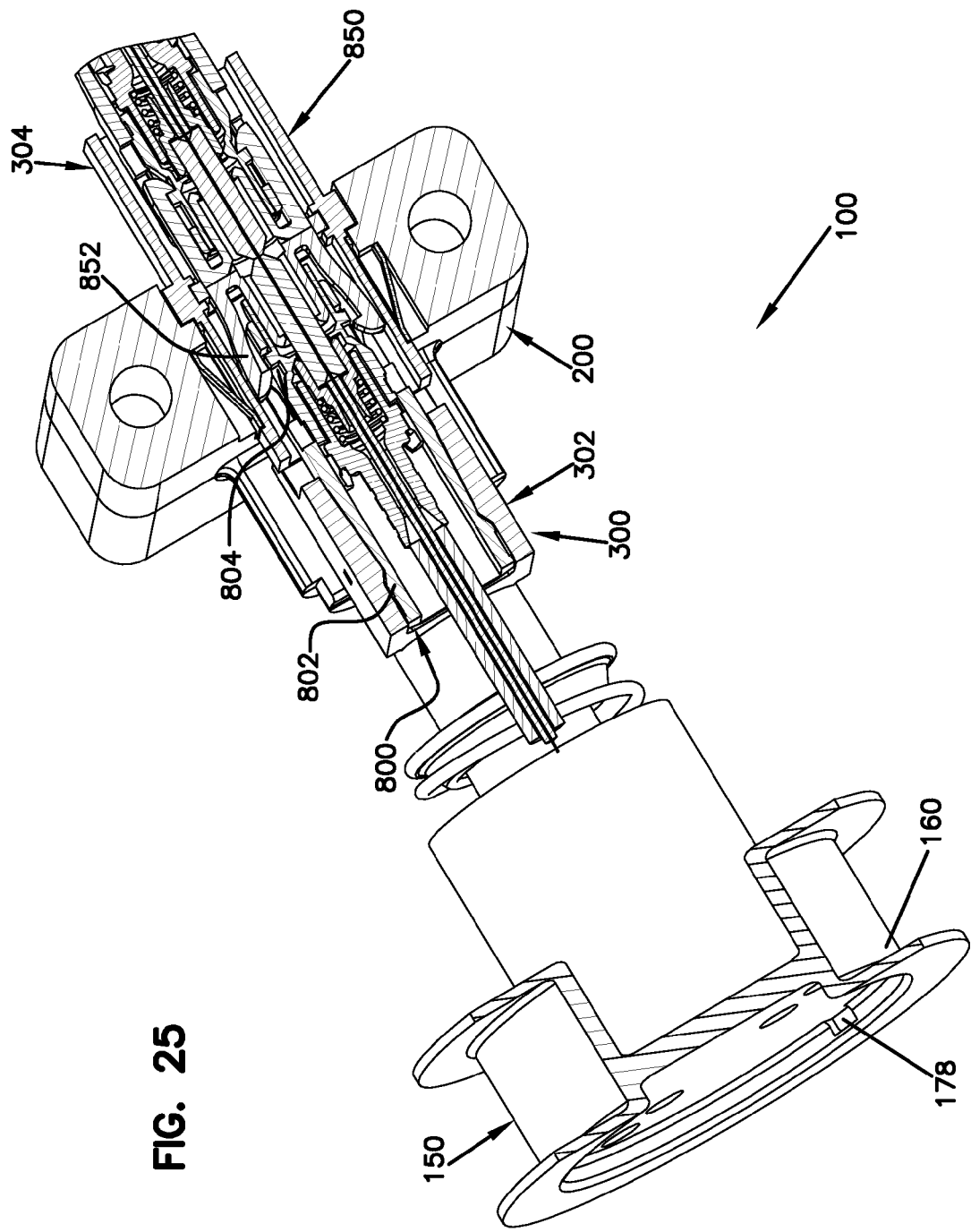
FIG. 25 is the perspective view of FIG. 24, but with the release sleeve of the fiber optic connector in the releasing configuration of FIG. 15.

A general description of an example assembly sequence will now be given for the spool assembly 100, as depicted at FIGS. 13-26. A spring 500 may be positioned and mounted at the hub 190 of the spool 150, as illustrated at FIG. 14. A shield 600 may be positioned over the spring 500 and also mounted to the hub 190. The actuating member 400 may be mounted over the shaft 192 of the spool 150. In particular, the thread engaging feature 404 is aligned with the assembly channel 199 of the shaft 192. This allows the actuating member 400 to be axially slid along the shaft 192 until the thread engaging feature 404 reaches the thread 198 of the shaft 192. The actuating member 400 may further be assembled onto the shaft 192 by screwing the actuating member 400 onto the shaft 192. In particular, the thread engaging feature 404 engages the thread 198 and thereby couples the rotational and axial relative movements between the actuating member 400 and the spool 150 according to a thread pitch of the thread 198. The thread pitch of the thread 198 may be a constant thread pitch or may be a variable thread pitch. The first part 302 may now be assembled into the mount 420. In the depicted embodiment, the first part 302 includes a fiber optic connector. In particular, as illustrated at FIG. 22, the first part 302 includes an SC fiber optic connector. The first part 302 mounts the second end 84 of the telecommunications cable 80. In the depicted embodiment, the SC fiber optic connector terminates the second end 84 of the telecommunications cable 80. Thus, the second end 84 is terminated with a ferrule (e.g. a ceramic ferrule). Furthermore, the second end 284 of the telecommunications cable 280 may also be terminated with a ferrule (e.g. a ceramic ferrule). The disconnect/reconnect device 300 may thereby use ferrules at the connection point.

After the actuating member 400 is assembled to the first part 302 of the disconnect/reconnect device 300 and properly positioned along the shaft 192 of the spool 150, the shaft 192 may be mounted to the mount 200. In the depicted embodiment, the actuating member 400 preferably compresses the spring 500 when the actuating member 400 is positioned along the shaft 192 at a position that allows the shaft 192 to be assembled to the mount 200.

The second part 304 of the disconnect/reconnect device 300 may be preassembled into the mount 200. In particular, in the depicted embodiment a fiber optic adapter forms a part of the second part 304 of the disconnect/reconnect device 300. The second part 304 is mounted in the mount 281 of the mount 200, as depicted at FIG. 22.

The shaft 192 may be assembled into the hole 202 of the mount 200. The bearing 194 of the shaft 192 is supported by the bearing 293 of the mount 200. The thrust bearing 196 of the shaft 192 is supported by the thrust bearing 295 of the mount 200. As illustrated at FIGS. 14 and 22, a spring 700 may be positioned between the spool 150 and the mount 200. In the depicted embodiment the spring 700 is illustrated schematically. The spring 700 may be a coil spring, a torsion spring, or other type of spring. The spring 700 may urge the spool 150 to rotate in a given rotational direction. The spring 700 may resist the first end 82 of the telecommunications cable 80 from being pulled off of the spool 150. The spring 700 may retract or may assist in the retraction of the telecommunications cable 80 when the telecommunications cable 80 is wound onto the spool 150. The wind-up portion 86 of the telecommunications cable 80 may be positioned in the coiling area 180 as illustrated at FIG. 14. The telecommunications cable 80 may be threaded through a hole 177 in the hub 190 before threading through the hole 178 that extends through the cylindrical surface 176. The wrapped portion 88 of the telecommunications cable 80 is wrapped about the cylindrical surface 176.

Figure 17:
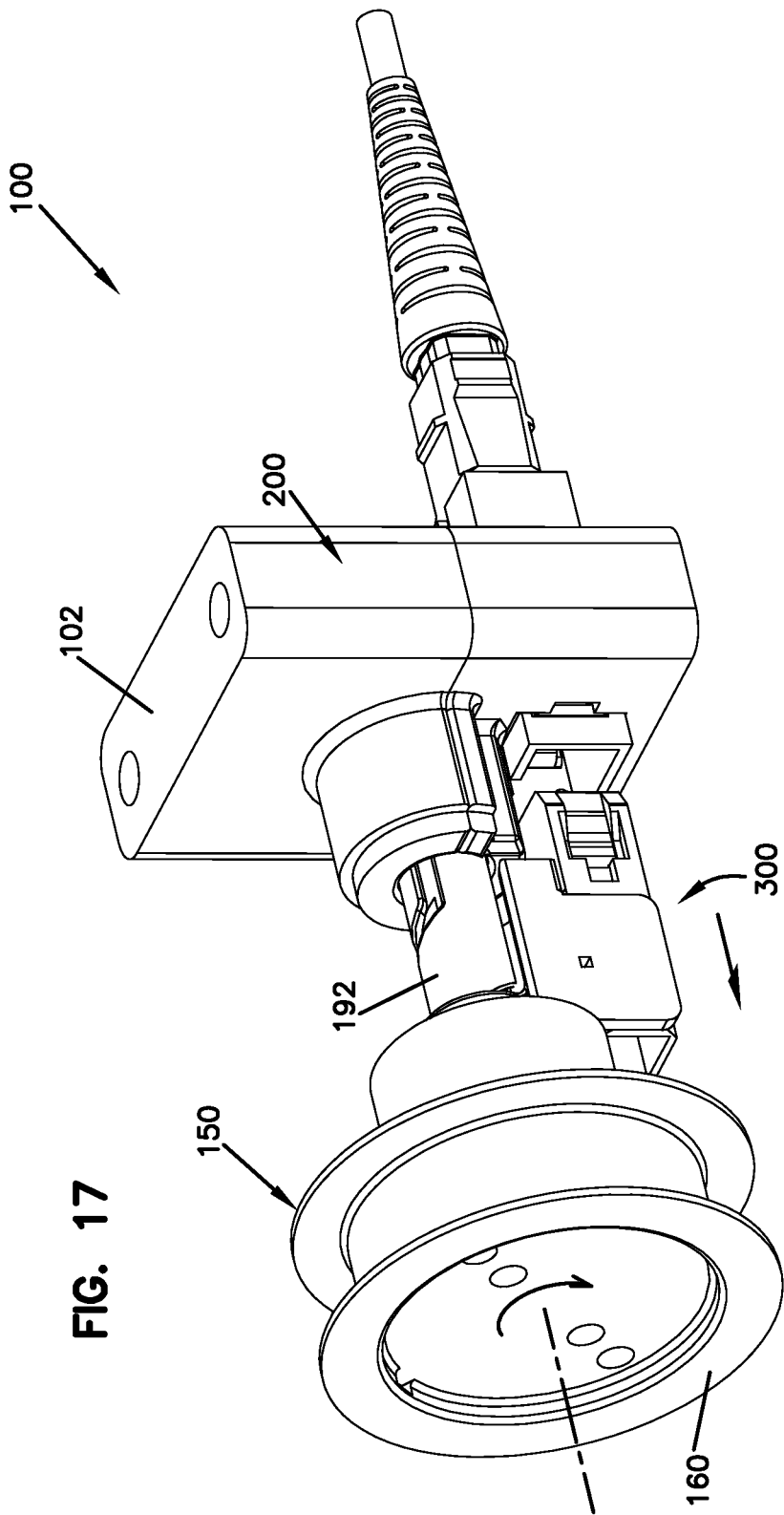
FIG. 17 is the perspective view of FIG. 13, but with the disconnect/reconnect mechanism further positioning the automatic cable disconnect/reconnect in a disconnected configuration.
Figure 18:
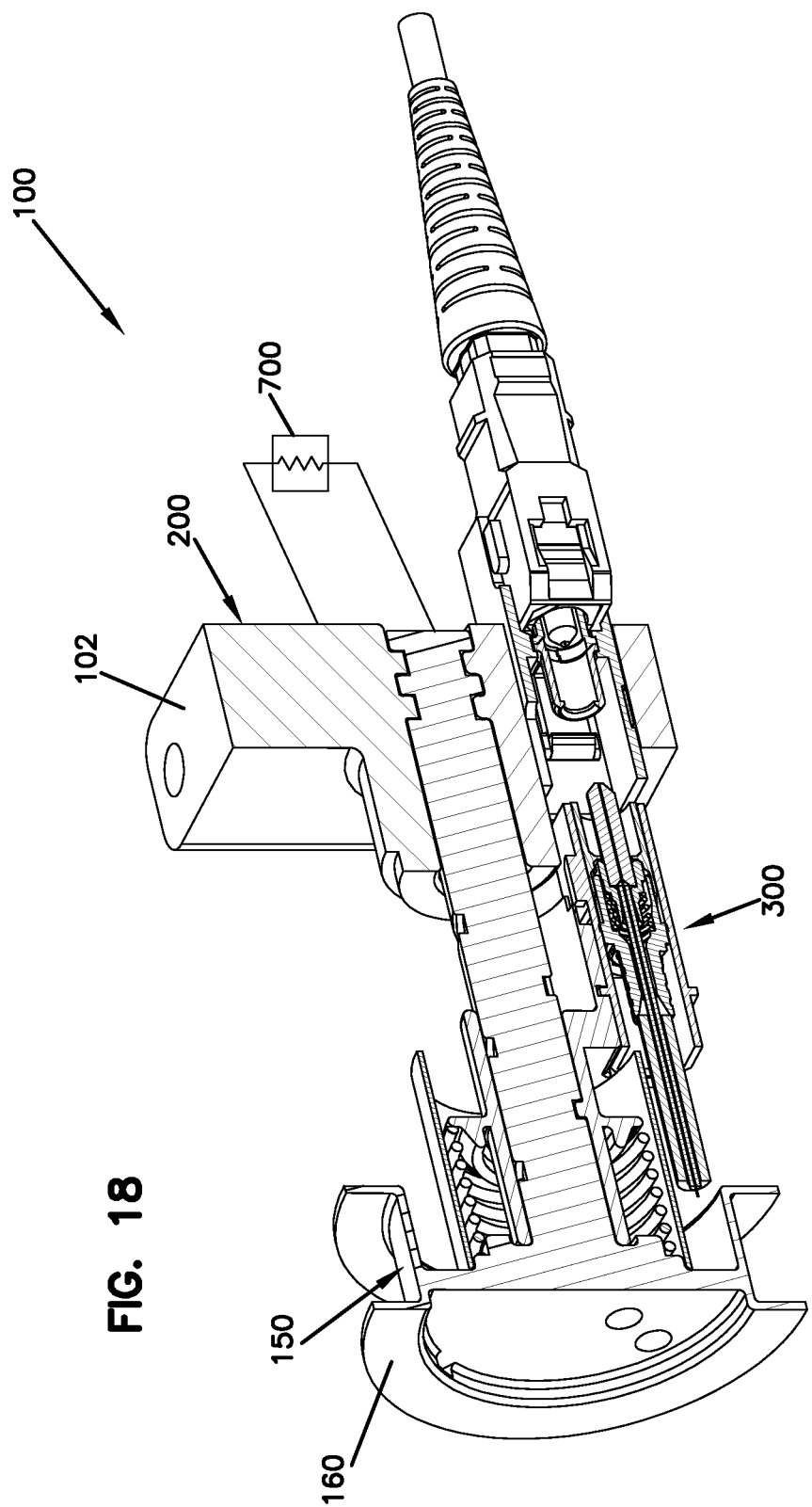
FIG. 18 is the perspective view of FIG. 17, but with the payout spool cutaway revealing the cross-section of the disconnect/reconnect mechanism of FIG. 14.
Figure 19:
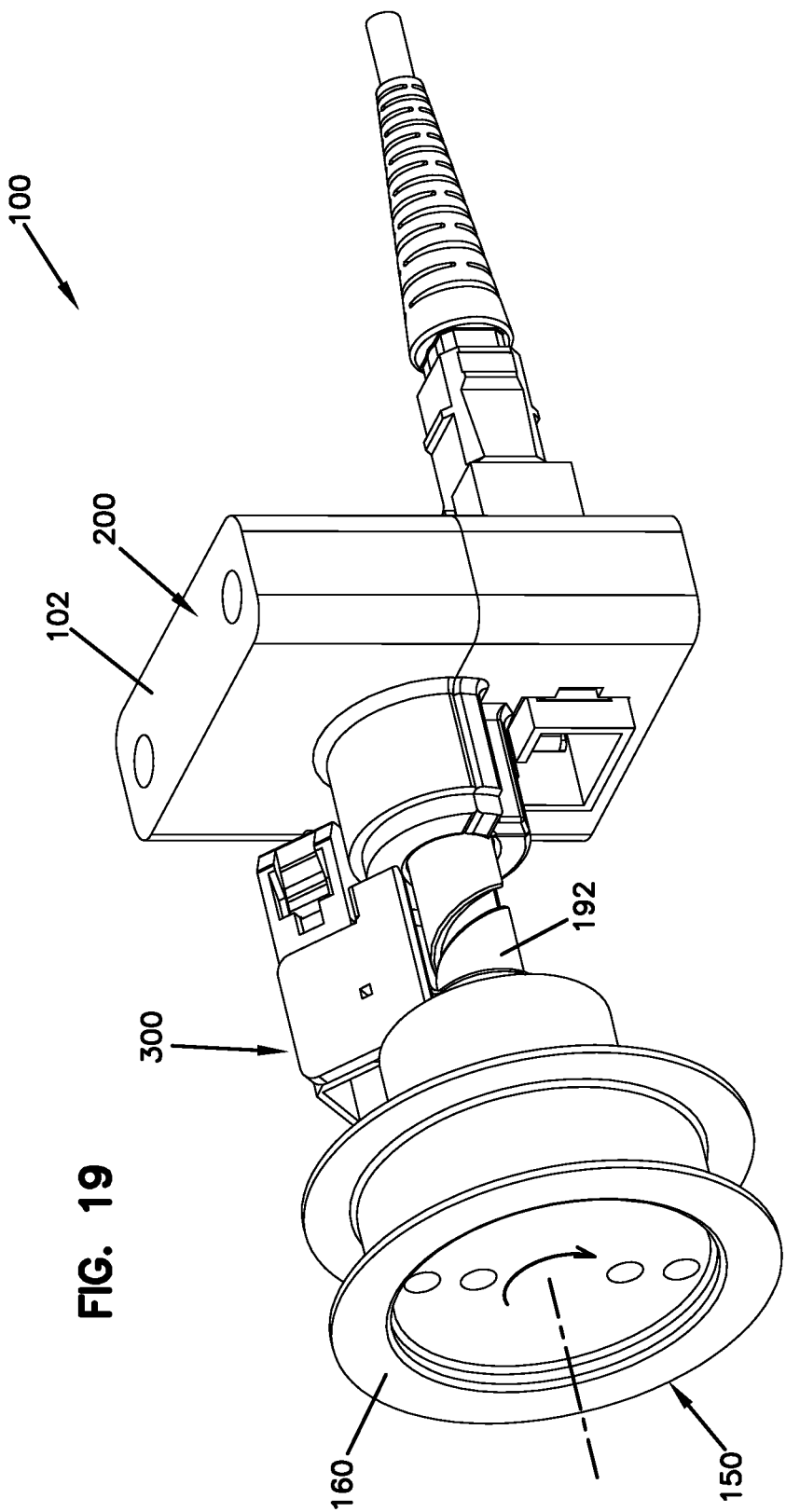
FIG. 19 is the perspective view of FIG. 13, but with the disconnect/reconnect mechanism rotated around an axis of the payout spool thereby allowing the payout spool to freely rotate.
Figure 20:
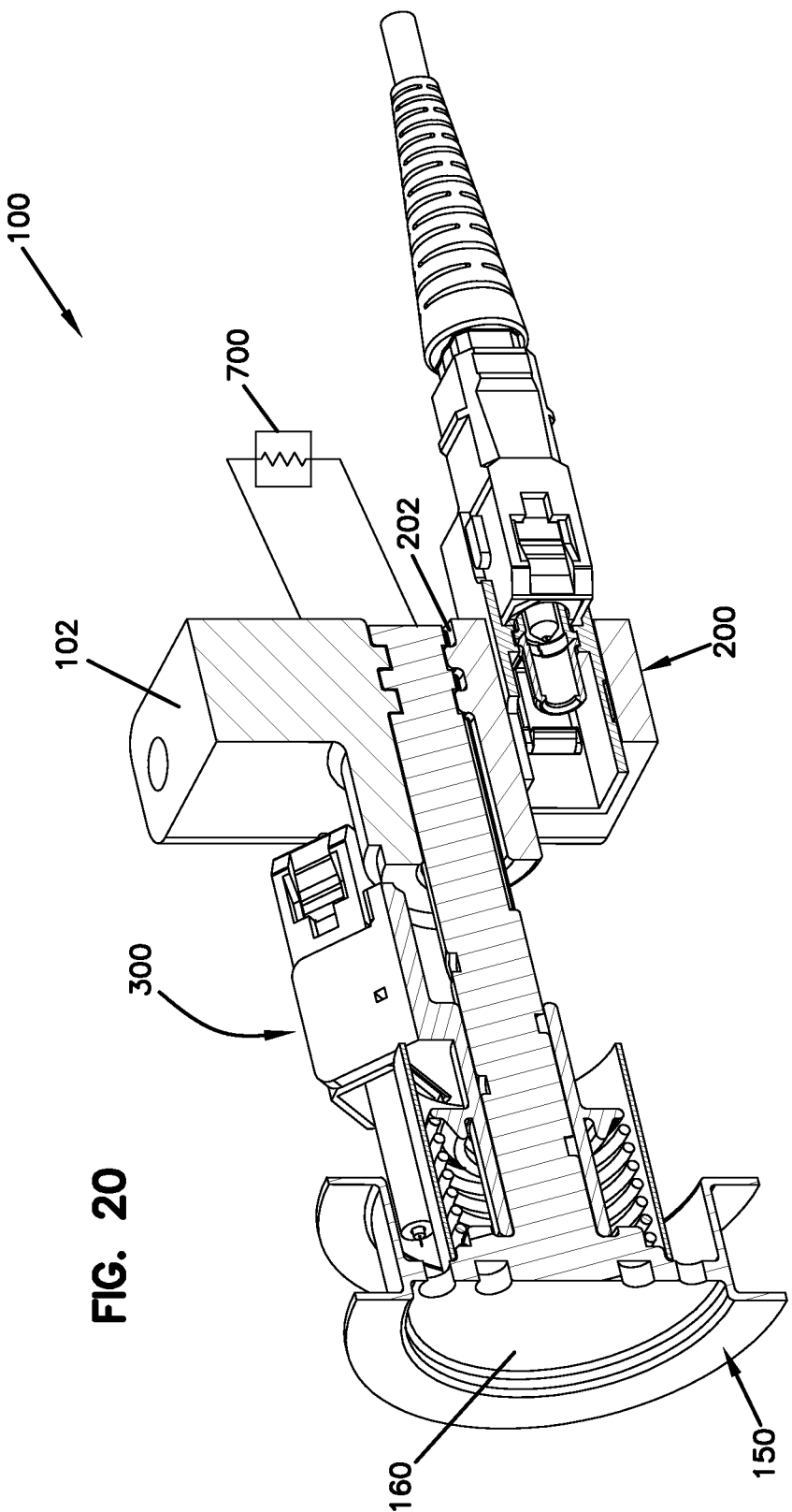
FIG. 20 is the perspective view of FIG. 19, but with the payout spool cutaway.
Figure 21:
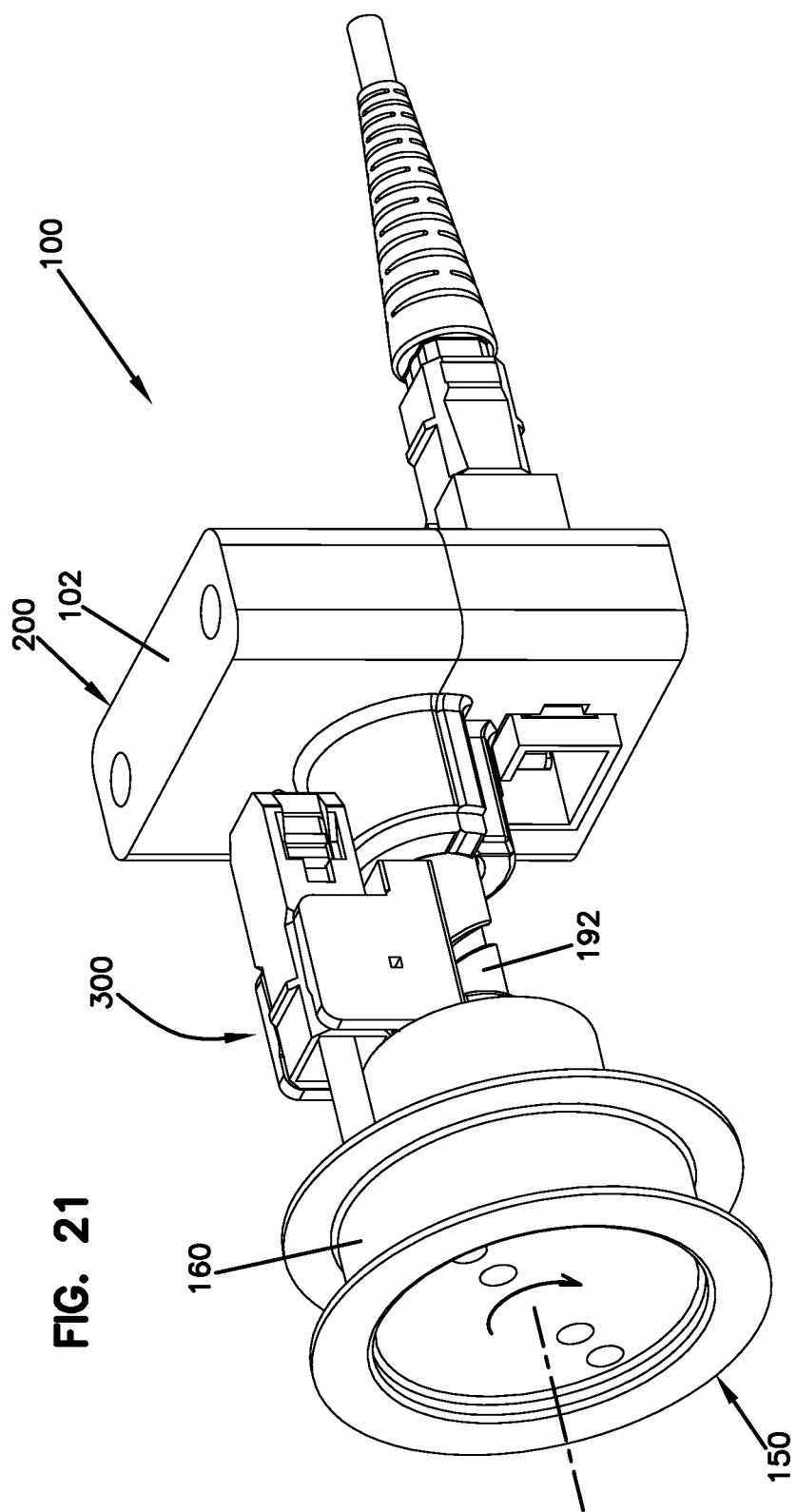
FIG. 21 is the perspective view of FIG. 19, but with the disconnect/reconnect mechanism further rotated around the axis of the payout spool.
Figure 26:
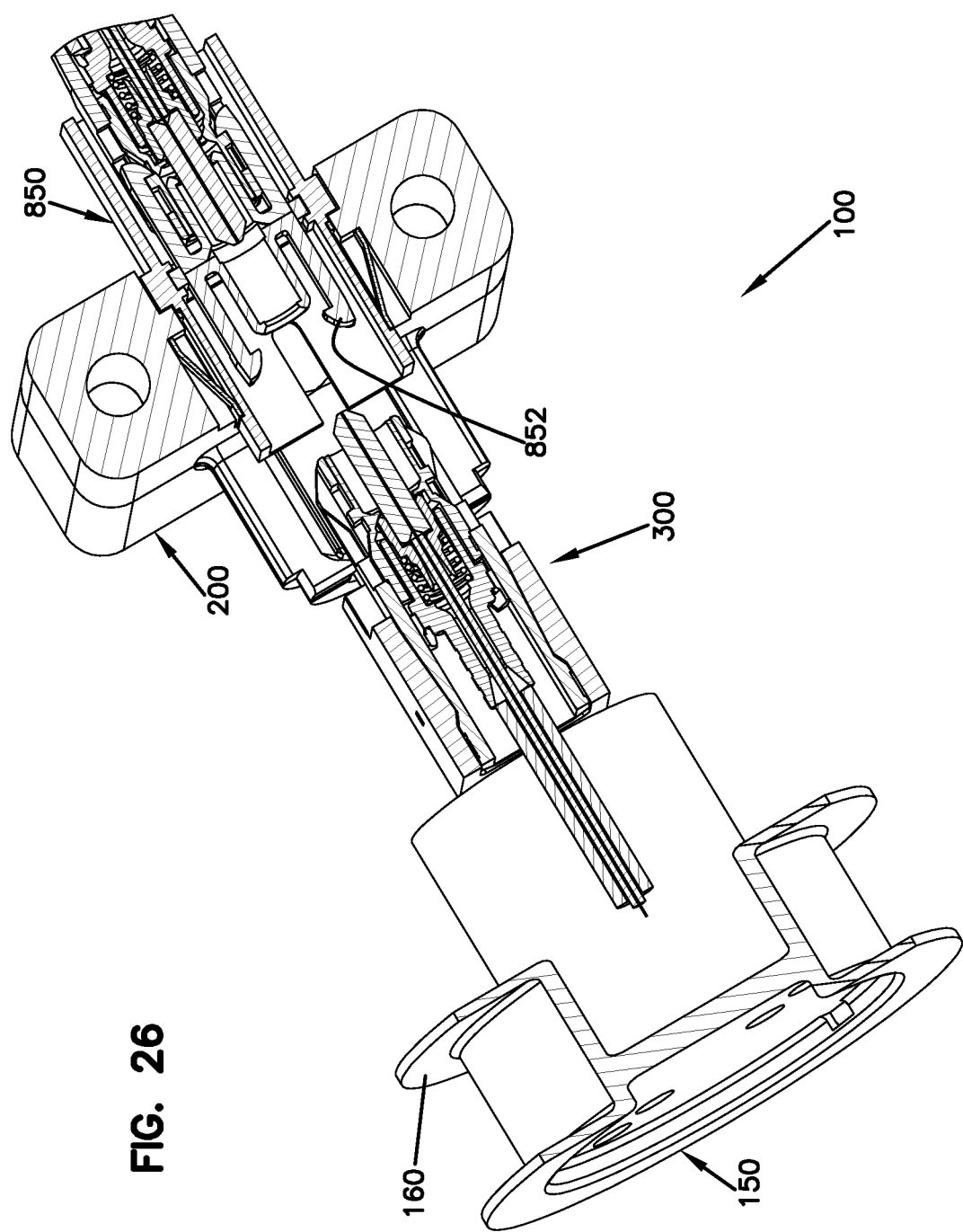
FIG. 26 is the perspective view of FIG. 24, but with the disconnect/reconnect mechanism further positioning the automatic cable disconnect/reconnect in the disconnected configuration of FIG. 17.

A description will now be given of the operation of the spool assembly 100, as illustrated at FIGS. 13-26. FIGS. 13 and 14 show the spool assembly 100 with the disconnect/reconnect device 300 connecting the second end 84 with the second end 284. Alternatively, the embodiment of FIGS. 13 and 14 shows the spool assembly 100 with the second end 84 connected to the second part 304. Upon rotation of the spool 150 in a rotational direction 902 (see FIG. 15), the actuating member 400 is pulled in a direction 904 by the thread engaging feature 404 engaging the thread 198. This movement of the actuating member 400 in the direction 904 compresses the spring 500 and moves a release sleeve 802 of a fiber optic connector 800 (see FIG. 16). As illustrated by the changes between FIGS. 24 and 25, the movement of the release sleeve 802 results in latches 852 of a fiber optic adapter 850 being released from a catch 804 of the fiber optic connector 800. By having a latching system make the connection between the first part 302 and the second part 304, a connection similar to or the same as a connection between a pair of the fiber optic connectors 800, when connected by the fiber optic adapter 850, can be realized. Upon the latches 852 releasing the fiber optic connector 800 from the fiber optic adapter 850, the fiber optic connector 800 connected to the first part 302 may be further moved to an axial position where the fiber optic connector 800 and the first part 302 clear the fiber optic adapter 850, as illustrated at FIGS. 17, 18, and 26.

The continued axial movement is provided by the actuating member 400. In particular, the guide 440 is guided along the slide 291 as the actuating member 400 is urged by the rotation of the spool 150. The rotation of the spool 150 during this axial translation portion of the movement is not accompanied by rotation of the first part 302. Instead, the wind-up portion 86 of the telecommunications cable 80 accommodates the relative rotation. The shield 600 keeps the wind-up portion 86 of the telecommunications cable 80 free from the spring 500. Upon the guide 440 reaching the end of the slide 291, the first part 302 of the disconnect/reconnect device 300 is free to rotate about the axis A1. The spring 500 may provide a torsional component that catches the first part 302 up rotationally with the spool 150. The thrust surface 260 may engage the actuating member 400 and thereby keep the actuating member 400 from being moved back toward the connected configuration. In particular, the thrust surface 260 may keep the actuating member 400 axially extended while the spool 150 is rotating and thereby paying-out or reeling-in the telecommunications cable 80.

As the telecommunications cable 80 is disconnected from the terminal 290, continued rotation of the spool 150 to pay-out additional length of the deployed portion 89 do not result in accumulated twist or wind up of the telecommunications cable 80. Thus, the rotation of the spool 150 is limited only by the storage capacity of the spool 150 for the telecommunications cable 80. The spring 700 may provide tension to the deployed portion 89 of the telecommunications cable 80.

Upon the first end 82 and/or the connector 90 reaching a desired position, the spool 150 is allowed to move into a position such that the guide 440 aligns with the slide 291. In certain embodiments, this alignment may be achieved by slowly rotating the spool 150 as the spring 500 applies a load between the actuating member 400 and the thrust surface 260. A clicking or pulse indication along the telecommunications cable 80 may indicate that the guide 440 is aligned with the slide 291.

The guide 440 may include transitional features (e.g., chamfers) that further assist in aligning the guide 440 with the slide 291. In addition, the first engagement feature 270 and the second engagement feature 272 may engage the guide 440 to facilitate the return of the disconnect/reconnect device 300 to the connected configuration. Upon the guide 440 engaging the slide 291, the telecommunications cable 80 may be slightly retracted onto the spool 150 (e.g., by the spring 700). The rotation, opposite from the rotation 902, allows the actuating member 400 to slide away from the disconnected configuration and toward the connected configuration. The latches 852 of the fiber optic adapter 850 will allow the fiber optic connector 800 to be reinserted into the fiber optic adapter 850 and thereby connect with the fiber optic adapter 850. Upon the reconnection of the fiber optic connector 800 with the fiber optic adapter 850, the telecommunications cable 80 is reconnected with the terminal 290. Thus, a signal can travel between the connector 90 and the terminal 290.

The process of retracting a substantial amount of the telecommunications cable 80 onto the spool 150 is substantially the same as the paying-out of the telecommunications cable 80. Upon retraction being desired, the first part 302 and the second part 304 of the disconnect/reconnect device 300 are disconnected by rotating the spool 150 to disengage the first part 302 from the second part 304 and move the first part 302 into the rotatable configuration (see FIG. 18). The spool 150 is then allowed to reverse rotation and retract a substantial amount of the telecommunications cable 80. In certain embodiments, allowing a rotation speed sufficient to keep the guide 440 from engaging the slide 291 will allow the spool 150 to continue retracting substantial amounts of the deployed portion 89 of the telecommunications cable 80. Upon a sufficient amount of the telecommunications cable 80 being retracted, the guide 440 and the slide 291 are aligned, similar to the process described above. Upon the guide 440 and the slide 291 being engaged, the actuating member 400 is allowed to move the first part 302 and the second part 304 into the connected configuration. Upon the second end 284 and the second end 84 being reconnected, the telecommunications cable 80 is again connected to the terminal 290.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. An optical fiber disconnect/reconnect apparatus comprising:
   a first member including a first optical component;
   a second member including a second optical component, the first member and the second member rotatable with respect to each other;
   a connected configuration with the first optical component and the second optical component optically connected to each other thereby allowing an optical signal to be transmitted between the first optical component and the second optical component;
   a disconnected configuration with the first optical component and the second optical component optically disconnected from each other; and a disconnect/reconnect device adapted to configure the optical fiber disconnect/reconnect apparatus in the disconnected configuration when the first member and the second member are rotated with respect to each other.

2. The optical fiber disconnect/reconnect apparatus of claim 1, wherein the disconnect/reconnect device is actuated by relative rotation between the first member and the second member.

3. The optical fiber disconnect/reconnect apparatus of claim 1, wherein the disconnect/reconnect device is actuated by an initial rotational movement between the first member and the second member and the initial rotational movement configures the optical fiber disconnect/reconnect apparatus in the disconnected configuration.

4. The optical fiber disconnect/reconnect apparatus of claim 3, wherein a wind-up portion of a fiber optic cable accommodates the initial rotational movement.

5. The optical fiber disconnect/reconnect apparatus of claim 4, wherein relative rotation between the first member and the second member beyond the initial rotational movement is not limited by the wind-up portion of the fiber optic cable.

6. The optical fiber disconnect/reconnect apparatus of claim 1, wherein the disconnect/reconnect device automatically configures the optical fiber disconnect/reconnect apparatus in the connected configuration when the first member and the second member are not rotated with respect to each other.

7. The optical fiber disconnect/reconnect apparatus of claim 1, wherein the first member includes a terminal for transmitting and/or receiving the optical signal to/from the first optical component.

8. The optical fiber disconnect/reconnect apparatus of claim 1, wherein the first optical component includes a first fiber optic cable and the second optical component includes a second fiber optic cable.

9. The optical fiber disconnect/reconnect apparatus of claim 1, wherein the disconnect/reconnect device includes a latching system.

10. The optical fiber disconnect/reconnect apparatus of claim 1, wherein the disconnect/reconnect device includes a fiber optic connector and a fiber optic adapter.

11. A method for rotating a first member including a first optical component relative to a second member including a second optical component, wherein the first optical component and the second optical component are optically connected to each other and thereby allow an optical signal to be transmitted between the first optical component and the second optical component at least when the first member and the second member are not rotated with respect to each other, the method comprising:
providing the first member including the first optical component;
providing the second member including the second optical component; and
actuating a disconnect/reconnect device by rotating the first member and the second member with respect to each other and thereby optically disconnecting the first optical component and the second optical component from each other.

12. The method of claim 11, further comprising optically reconnecting the first optical component and the second optical component to each other when the first member and the second member are not rotated with respect to each other.

13. The method of claim 12, wherein the first optical component includes a first fiber optic cable and the second optical component includes a second fiber optic cable.

14. The method of claim 11, further comprising automatically optically reconnecting the first optical component and the second optical component to each other when the first member and the second member are not rotated with respect to each other.

15. The method of claim 11, further comprising actuating a disconnect/reconnect device by rotating the first member and the second member by an initial rotational movement with respect to each other and thereby optically disconnecting the first optical component and the second optical component from each other.

16. The method of claim 15, further comprising accommodating the initial rotational movement by winding-up a wind-up portion of a fiber optic cable.

17. A spool for a fiber optic cable, the spool comprising:
the fiber optic cable extending between a first end and a second end;
a base including an optical component;
a spool member rotatable with respect to the base about an axis, the spool member adapted to unwrap and wrap the fiber optic cable about a wrapping area of the spool member when the spool member is rotated about the axis;
a connected configuration with the optical component and the fiber optic cable optically connected to each other thereby allowing an optical signal to be transmitted between the optical component and the fiber optic cable;
a disconnected configuration with the optical component and the fiber optic cable optically disconnected from each other; and
a disconnect/reconnect device adapted to configure the spool in the disconnected configuration when the spool member is rotated with respect to the base.

18. The spool of claim 17, wherein the disconnect/reconnect device is actuated by rotation of the spool member.

19. The spool of claim 17, wherein the disconnect/reconnect device is actuated by an initial rotational movement of the spool member and the initial rotational movement configures the spool in the disconnected configuration.

* * * * *